United States Patent
Cheng et al.

(10) Patent No.: US 10,212,178 B2
(45) Date of Patent: Feb. 19, 2019

(54) PACKET ANALYSIS BASED IOT MANAGEMENT

(71) Applicant: ZingBox, Ltd., Mountain View, CA (US)

(72) Inventors: Gong Cheng, Sunnyvale, CA (US); Pui-Chuen Yip, Cupertino, CA (US); Zhiwei Xiao, Palo Alto, CA (US); Ran Xia, Campbell, CA (US); Mei Wang, Saratoga, CA (US)

(73) Assignee: ZingBox, Ltd., Mountain View, CA (US)

(*) Notice: Subject to any disclaimer, the term of this patent is extended or adjusted under 35 U.S.C. 154(b) by 182 days.

(21) Appl. No.: 15/087,861

(22) Filed: Mar. 31, 2016

(65) Prior Publication Data

US 2016/0301707 A1 Oct. 13, 2016

Related U.S. Application Data

(60) Provisional application No. 62/144,077, filed on Apr. 7, 2015.

(51) Int. Cl.
*H04L 29/06* (2006.01)
*H04L 12/26* (2006.01)
*H04L 29/08* (2006.01)

(52) U.S. Cl.
CPC .......... *H04L 63/1425* (2013.01); *H04L 43/00* (2013.01); *H04L 67/12* (2013.01)

(58) Field of Classification Search
CPC .................................................. H04L 63/1425
USPC ......................................................... 726/23
See application file for complete search history.

(56) References Cited

U.S. PATENT DOCUMENTS

| | | | |
|---|---|---|---|
| 8,159,966 B1 | 4/2012 | Mabee et al. | |
| 8,891,528 B2 | 11/2014 | Moriarty et al. | |
| 9,891,907 B2* | 2/2018 | Searle ................ | H04L 41/082 |
| 9,984,344 B2* | 5/2018 | Singh .................. | H04W 4/70 |
| 2012/0240185 A1 | 9/2012 | Kapoor et al. | |
| 2015/0039513 A1 | 2/2015 | Adjaoute | |
| 2015/0055623 A1 | 2/2015 | Li et al. | |
| 2016/0218949 A1* | 7/2016 | Dasgupta ........... | H04L 63/1416 |
| 2017/0272554 A1* | 9/2017 | Kwan ................. | H04L 69/22 |
| 2017/0331671 A1* | 11/2017 | Olsson ............... | H04L 41/04 |
| 2017/0339178 A1* | 11/2017 | Mahaffey .......... | H04L 63/1425 |

OTHER PUBLICATIONS

International Application No. PCT/US2016/025661, International Search Report and Written Opinion dated Jul. 7, 2016.

* cited by examiner

*Primary Examiner* — Khalil Naghdali
(74) *Attorney, Agent, or Firm* — Sheppard, Mullin, Richter & Hampton LLP

(57) ABSTRACT

Data packets transmitted to and from an IoT device are obtained and at least one of the data packets are analyzed using deep packet inspection to identify transaction data from payload of the at least one of the data packets. An event log is generated for the IoT device from the transaction data, the event log, at least in part, used to generate a historical record for the IoT device. The IoT device into a device profile based on the historical record for the IoT device. The event log is updated in real-time to indicate current operation of the IoT device. Abnormal device behavior of the IoT device is determined using the event log and the device profile. The device profile is updated to indicate the abnormal device behavior of the IoT device.

24 Claims, 18 Drawing Sheets

PACKET ANALYSIS BASED IOT MANAGEMENT

CROSS-REFERENCE TO RELATED APPLICATION

This application claims priority to U.S. Provisional Patent Application No. 62/144,077, filed Apr. 7, 2015, which is incorporated by reference herein.

BACKGROUND

An area of ongoing research and development is smart devices. In particular Internet of things (hereinafter referred to as "IoT devices"), have been developed allowing for network based control of devices used in daily functioning of lives.

While IoT devices provide convenience in their ability to be controlled through a network from remote locations passively, there exist problems with managing IoT devices. In particular problems exist in preventing attacks against IoT devices. There therefore exists the need for managing IoT devices to prevent attacks against IoT devices.

The foregoing examples of the related art and limitations related therewith are intended to be illustrative and not exclusive. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

In various implementations, data packets transmitted to and from an IoT device are obtained and at least one of the data packets are analyzed using deep packet inspection to identify transaction data from payload of the at least one of the data packets. Further, in various implementations, an event log is generated for the IoT device from the transaction data, the event log, at least in part, used to generate a historical record for the IoT device. In various implementations, the IoT device into a device profile based on the historical record for the IoT device. Additionally, in various implementations, the event log is updated in real-time to indicate current operation of the IoT device. In various implementations, abnormal device behavior of the IoT device is determined using the event log and the device profile. Further, in various implementations, the device profile is updated to indicate the abnormal device behavior of the IoT device.

These and other advantages will become apparent to those skilled in the relevant art upon a reading of the following descriptions and a study of the several examples of the drawings.

DETAILED DESCRIPTION

Figure 1:
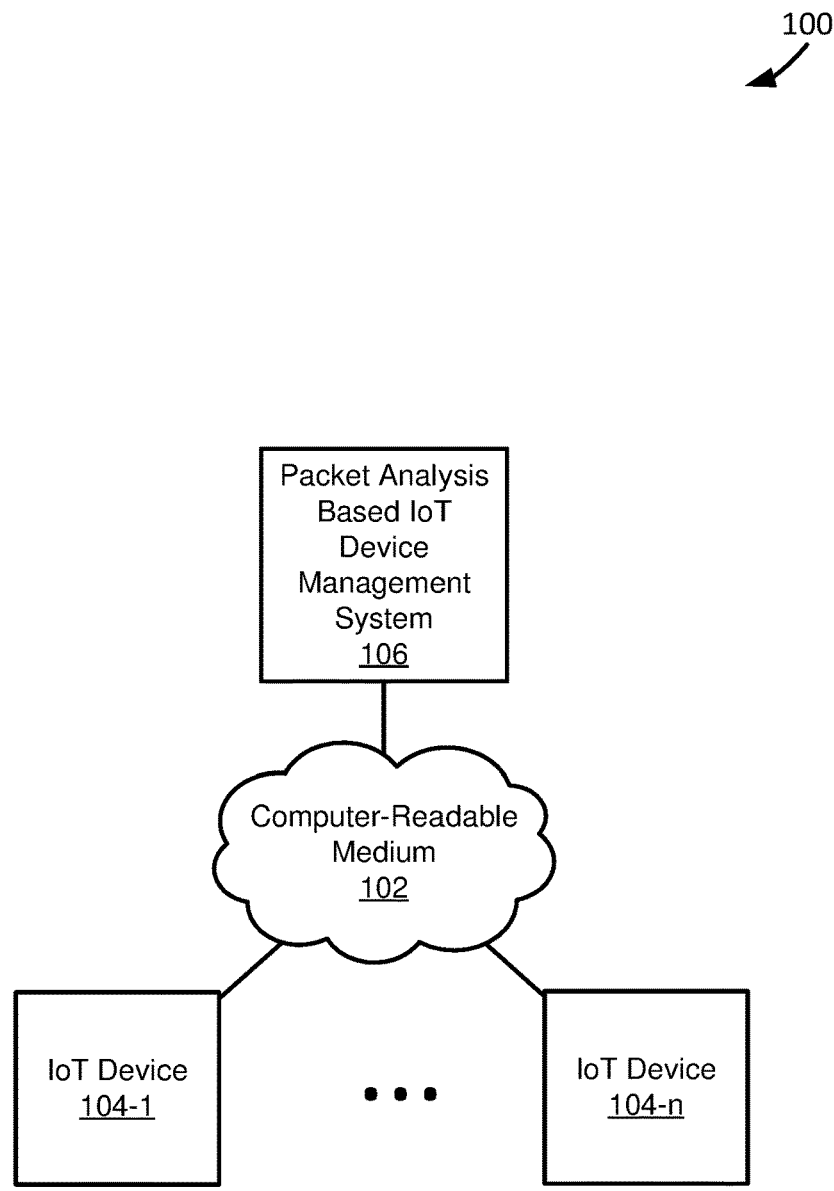
FIG. 1 depicts a diagram of an example of a system for managing IoT devices based on packet analysis.

FIG. 1 depicts a diagram 100 of an example of a system for managing IoT devices based on packet analysis. The system of the example of FIG. 1 includes a computer-readable medium 102, IoT device 104-1 . . . 104-n (hereinafter referred to as "IoT devices 104") coupled to the computer-readable medium 102, and a packet analysis based IoT device management system 106.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the IoT devices 104, the packet analysis based IoT device management system 106, and other applicable systems or devices described in this paper can be implemented as a computer system or parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The IoT devices 104 function to send and receive data through a network. The IoT devices 104 include wired or wireless interfaces through which the IoT devices 104 can send and receive data over wired and wireless connections. Examples of IoT devices include thermostats, mobile devices, biological managers, sensory devices, and functionality performing devices. The IoT devices 104 can include unique identifiers which can be used in the transmission of data through a network. Unique identifiers of the IoT devices 104 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the IoT devices 104 can include applicable communication interfaces for receiving and sending data according to an applicable wireless device protocol. Examples of applicable wireless device protocols include Wi-Fi, ZigBee, Bluetooth®, and applicable low-power communication standards.

The packet analysis based IoT device management system 106 functions to manage or facilitate management of IoT devices using packet analysis of data packets transmitted to and from the IoT devices. In various implementations, the packet analysis based IoT device management system 106 sniffs packets transmitted to and from IoT devices for the purposes of managing IoT devices. The IoT device management system 106 can sniff packets for purposes of managing security of IoT devices. For example, the packet analysis based IoT device management system 106 can sniff packets transmitted to and from an IoT device to determine that the IoT device is behaving abnormally, and subsequently stop transmission of data packets to the IoT device. Depending upon implementation-specific or other considerations, the packet analysis based IoT device management system 106 can control data transmission between IoT devices, e.g. IoT devices forming part of a LAN. For example, the packet analysis based IoT device management system 106 can control the transmission of data between a thermostat and a computer within a LAN. Further depending upon implementation-specific or other considerations, the packet analysis based IoT device management system 106 can control the transmission of data between an IoT device and a source in a WAN. For example, the packet analysis based IoT device management system 106 can control the transmission of data between an IoT device and a server hosting an application through the Internet.

In a specific implementation, the packet analysis based IoT device management system 106 profiles IoT devices for use in managing or facilitating management of the devices. A profile, as used in this paper, includes operational parameters of IoT devices. Example operational parameters of IoT devices include events occurring at IoT devices, user access to IoT devices, and system operation characteristics of IoT devices. For example, operational parameters of IoT devices can include device types, operating systems and applications executing at or capable of being executed at IoT devices, entities associated with IoT devices, users who interact with IoT devices, and systems and devices with which the IoT devices communicate.

In a specific implementation, the packet analysis based IoT device management system 106 is implemented, at least in part, through a local agent. A local agent, as used in this paper, is a physical device locally coupled to IoT devices for use in transmitting data to and from the IoT devices. Depending upon implementation-specific or other considerations, the packet analysis based IoT device management system 106 can include a wired and/or a wireless communication interface for transmitting data to and from IoT devices over either or both a wired communication channel and a wireless communication channel. The packet analysis based IoT device management system 106 can be, at least in part, a device provided by an Internet service provider and/or directly purchased by a consumer and acting as a conduit between networks. Depending upon implementation or other considerations, the packet analysis based IoT device management system 106 can be used in transmitting data as part of a private cloud. A private cloud maintained through the packet analysis based IoT device management system 106 can be specific to an entity. The packet analysis based IoT device management system 106 can function according to applicable protocols for forming part of a wireless network, including Wi-Fi, such as the IEEE 802.11 standards, which are hereby incorporated by reference.

In a specific implementation, at least a portion of the packet analysis based IoT device management system 106 is wirelessly coupled to IoT devices, which act as or include stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium. In a specific implementation, at least a portion of the packet analysis based IoT device management system 106 is also implemented as a station, such as an access point (AP) station.

In a specific implementation, at least a portion of the packet analysis based IoT device management system 106 is compliant with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, at least a portion of the packet analysis based IoT device management system 106 is implemented remote from IoT devices it manages. For example, at least a portion of the packet analysis based IoT device management system 106 can be implemented as cloud based systems. Depending upon implementation-specific or other considerations, portions of the packet analysis based IoT device management system 106 implemented remote from IoT device can transmit and receive data to and from the IoT devices through virtual private network (hereinafter "VPN") tunnels. For example, the packet analysis based IoT device management system 106 can receive outbound network traffic sent from IoT devices over a VPN tunnel. Depending upon implementation-specific or other considerations, the packet analysis based IoT device management system 106 can maintain VPN tunnels using dedicated networking equipment. For example, the packet analysis based IoT device management system 106 can send and receive data to and from IoT devices using dedicated routers for communicating with the IoT devices. Further depending upon implementation-specific or other considerations, the packet analysis based IoT device management system 106 can select which data to transmit via VPN tunnels. For example, the packet analysis based IoT device management system 106 can determine that all traffic sent from a specific IoT device should be transmitted via VPN tunnels.

In a specific implementation, the packet analysis based IoT device management system 106 functions to maintain event logs for IoT devices. An event log includes events associated with IoT devices. Events can include applicable parameters related to operation of an IoT device, such as what data is sent to and from the IoT device, destinations and origins of data sent to and from the IoT device, identifications of the IoT device, geographic information relating to the IoT device, and interaction types corresponding to patterns of events. For example, an event log can include a pattern of events corresponding to a specific way in which an IoT device is being interacted with or otherwise functioning. In various implementations, the packet analysis based IoT device management system 106 uses an event log for an IoT device to manage security of the IoT device. For example, the packet analysis based IoT device management system 106 can analyze an event log to determine historical normal behavior of an IoT device and compare the historic normal behavior to current behavior of the IoT device to determine if the IoT device is behaving abnormally. Further in the example, the packet analysis based IoT device management system 106 can suspend transmission of data to and from the IoT device if it determines that the IoT device is acting abnormally. Depending upon implementation-specific or other considerations, the packet analysis based IoT device management system 106 can maintain an event log using deep packet inspection. For example, the packet analysis based IoT device management system 106 can use deep packet inspection to model behavior of an IoT device and create a normal behavior device profile for the IoT device.

In a specific implementation, the packet analysis based IoT device management system 106 functions to maintain a system log for IoT devices. A system log can include applicable information relating to systems of managed IoT devices. For example, a system log can include applications, operating systems executed at an IoT device, and/or capabilities of an IoT device, e.g. whether an IoT device is capable of communicating with a remote source. Depending upon implementation-specific or other considerations, the packet analysis based IoT device management system 106 can maintain a system log using deep packet inspection. For example, the packet analysis based IoT device management system 106 can use deep packet inspection to determine an identification of an application that has been or is being pushed to an IoT device, and subsequently update a system log for the IoT device to reflect that the application is being pushed to the IoT device. In various implementations, the packet analysis based IoT device management system 106 uses a system log for an IoT device to manage security of the IoT device. For example, the packet analysis based IoT device management system 106 can use a system log to determine that malware is being pushed to an IoT device. Further in the example, the packet analysis based IoT device management system 106 can block transmission of the malware to the IoT device. In various implementations, a system log for IoT devices can be maintained by the packet analysis based IoT device management system 106 at a location remote from locations of the IoT devices. For example, the packet analysis based IoT device management system 106 can maintain a system log in a cloud location.

In a specific implementation, the packet analysis based IoT device management system 106 functions to maintain access logs for IoT devices. An access log includes applicable information related to users utilizing IoT devices. For example, an access log can include an identification of a user who utilized an IoT device, times when the user accessed the IoT device, locations of the IoT device when it was accessed by a specific user, locations of the user when accessing the IoT device, characteristics of different types of access to the IoT device, e.g. remote access, and ways in which a specific user utilizes the IoT device, which can also be included as part of or maintained separately as an event log. In various implementations, the packet analysis based IoT device management system 106 uses an access log for an IoT device to manage security of the IoT device. For example, the packet analysis based IoT device management system 106 can analyze an access log to determine historical normal behavior of a user in interacting with an IoT device and compare the historic normal behavior to current behavior of the user in interacting with the IoT device to determine if the user is behaving abnormally in interacting with the IoT device. Further in the example, the packet analysis based IoT device management system 106 can suspend transmission of data to and from the IoT device if it determines that the user is behaving abnormally with the IoT device. Depending upon implementation-specific or other considerations, the packet analysis based IoT device management system 106 can maintain an access log using deep packet inspection. For example, the packet analysis based IoT device management system 106 can use deep packet inspection to determine interaction of a user in utilizing an IoT device. Further in the example, the packet analysis based IoT device management system 106 can determine whether a user is interacting with the IoT device remotely.

In a specific implementation, the packet analysis based IoT device management system 106 functions to probe IoT devices to learn abilities of the IoT devices. In various implementations, a result of probing IoT devices can be used by the packet analysis based IoT device management system 106 to manage security of the IoT devices. For example, the packet analysis based IoT device management system 106 can probe an IoT device to determine if it is capable of having malware installed on it and subsequently update an applicable log, e.g. a system log, to indicate that the IoT device is capable of having malware installed on it. In various implementations, the packet analysis based IoT device management system 106 can probe an IoT device by sending an active packet to the IoT device that causes the IoT device to response and thereby potentially exposes risks of the IoT device. For example, the packet analysis based IoT device management system 106 can send a packet to an IoT device that simulates an attack on the IoT device. Further in the example, the packet analysis based IoT device management system 106 can obtain data transmitted from the IoT device to determine how the IoT device responds to a simulated attack, and subsequently potentially expose vulnerabilities of the IoT device. In another example, the packet analysis based IoT device management system 106 can send a packet to an IoT device to force the IoT device to send traffic and subsequently use the forced traffic to determine vulnerabilities of the IoT device.

In a specific implementation, the packet analysis based IoT device management system 106 functions to perform analytic analysis and/or provide functionalities for performing analytics. In various implementations, the packet analysis based IoT device management system 106 can provide functionalities to perform analytics. For example, the packet analysis based IoT device management system 106 can provide functionalities for performing analytics to an administrator and/or an outside IoT device management entity. In various implementations, the packet analysis based IoT device management system 106 can perform analytics in managing security of IoT devices. Depending upon implementation-specific or other considerations the packet analysis based IoT device management system 106 can perform analytic analysis or provide functionalities for performing analytics using at least one of an access log, an event log, and a system log of IoT devices created, at least in part, through deep packet inspection. For example, the packet analysis based IoT device management system 106 can cluster devices together based on device type and use an event log of the clustered devices to generate a baseline device operating profile indicating how an IoT device of the device type normally operates. Further in the example, the packet analysis based IoT device management system 106 can use the baseline device operating profile to determine IoT devices of the device type which are behaving abnormally.

Figure 2:
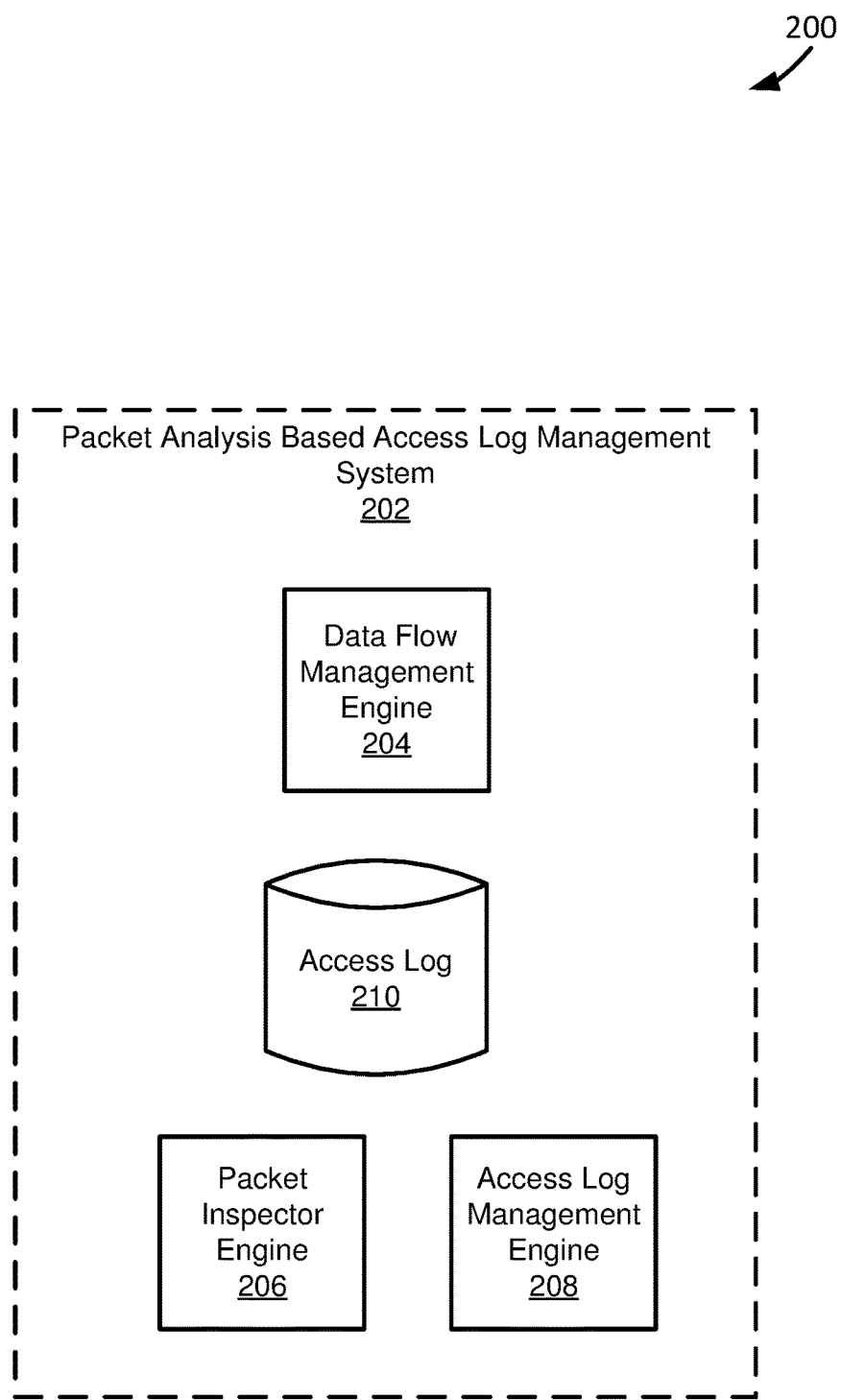
FIG. 2 depicts a diagram of an example packet analysis based access log management system.

FIG. 2 depicts a diagram 200 of an example packet analysis based access log management system 202. The packet analysis based access log management system 202 functions to use packet analysis to manage access logs for IoT devices. The packet analysis based access log management system 202 can be implemented as part of an applicable system for managing IoT devices using packet analysis, such as the packet analysis based IoT device management systems described in this paper. In various implementations, an access log managed by the packet analysis based access log management system 202 can be used to enforce security at IoT devices. Depending upon implementation-specific or other considerations, the packet analysis based access log management system 202 can inspect packets at a location local with respect to IoT devices for which the packet analysis based access log management system 202 manages an access log. For example, the packet analysis based access log management system 202 can be implemented, at least in part, at a local appliance coupled to IoT devices, and subsequently inspect packets sent to and received from the IoT devices at the appliance. Further depending upon implementation-specific or other considerations, the packet analysis based access log management system 202 can inspect packets at a remote location with respect to IoT devices for which the packet analysis based access log management system 202 manages an access log. For example, the packet analysis based access log management system 202 can be implemented at a remote location from IoT devices, e.g. the cloud, and subsequently inspect packets sent to and received from the IoT devices at the remote location, e.g. in-line. In various implementations, when the packet analysis based access log management system 202 is implemented to inspect packets at a remote location with respect to IoT devices, the packet analysis based access log management system 202 can receive packets for inspection through VPN tunneling.

The example packet analysis based access log management system 202 shown in FIG. 2 includes a data flow management engine 204, a packet inspector engine 206, an access log management engine 208, and an access log datastore 210. The data flow management engine 204 functions to control the flow of data packets to and from IoT devices. In controlling the flow of data packets to and from IoT devices, the data flow management engine 204 can obtain data packets. In various implementations, the data flow management engine 204 can use packet sniffing to obtain data packets. For example, the data flow management engine 204 can analyze headers of data packets to determine which data packets to obtain for subsequent performance of packet inspection. Further, in controlling the flow of data packets to and from IoT devices, the data flow management engine 204 can forward the data packets to an appropriate destination. For example, if a data packet is addressed to a specific IoT device, then the data flow management engine 204 can forward the data packet to the specific IoT device. In various implementations, the data flow management engine 204 can forward data packets after the packets have been inspected. For example, the data flow management engine 204 can forward data packets after deep packet inspection has been performed on the data packets.

In a specific implementation, the data flow management engine 204 functions to manage forwarding of data packets through VPN tunnels. In managing forwarding of data packets through VPN tunnels, the data flow management engine 204 can forward data packets to appropriate destinations using VPN tunnels. For example, the data flow management engine 204 can forward a data packet using a VPN tunnel, by forwarding the data packet to an ultimate destination through dedicated networking equipment, e.g. routers, for VPN tunneling. In managing forwarding of data packets through VPN tunnels, the data flow management engine 204 can select specific data packets to forward using VPN tunnels. Depending upon implementation-specific or other considerations, the data flow management engine 204 can select data packets to forward through VPN tunneling based, at least in part, on an origin and/or a destination of the data packet. For example, the data flow management engine 204 can forward data packets sent from a specific IoT device through VPN tunneling. Further depending upon implementation-specific or other considerations, the data flow management engine 204 can select data packets to forward through VPN tunneling based, at least in part, on a packet type and/or data contained in data packets. For example, if a data packet relates to sensitive information of a user, then the data flow management engine 204 can forward the packet through VPN tunneling. A packet type and/or data contained in data packets can be determined by an applicable packet sniffing technique, e.g. deep packet inspection.

In a specific implementation, a portion of the data flow management engine 204 is implemented as a local appliance, with respect to IoT devices, and another portion of the data flow management engine 204 is implemented remote from the IoT devices, e.g. in the cloud. In various implementations, a locally implemented portion of the data flow management engine 204 can obtain data packets transmitted from IoT devices and transmit the data packets to a remotely implemented portion of the data flow management engine 204. Depending upon implementation-specific or other considerations, a locally implemented portion of the data flow management engine 204 can obtain data packets transmitted from IoT devices and transmit the data packets to a remotely implemented portion of the data flow management engine 204 through VPN tunneling. Further depending upon implementation-specific or other considerations, data packets transmitted from a locally implemented portion of the data flow management engine 204 to a remotely implemented portion of the data flow management engine 204 can be analyzed at the remote location, e.g. in the cloud.

In a specific implementation, a remotely implemented portion of the data flow management engine 204 can obtain data packets destined to IoT devices and transmit the data packets to a locally implemented portion of the data flow management engine 204. Depending upon implementation-specific or other considerations, a remotely implemented portion of the data flow management engine 204 can obtain data packets destined to IoT devices and transmit the data packets to a remotely implemented portion of the data flow management engine 204 through VPN tunneling. Further depending upon implementation-specific or other considerations, data packets transmitted from a remotely implemented portion of the data flow management engine 204 to a locally implemented portion of the data flow management engine 204 can be analyzed at the remote location, e.g. in the cloud, or locally, e.g. at a local appliance.

The packet inspector engine 206 functions to sniff packets sent to and from IoT devices for the purposes of managing IoT devices. In various implementations, the packet inspector engine 206 functions to sniff packets for purposes of managing security of IoT devices. For example, the packet inspector engine 206 can sniff packets to determine a user of an IoT device. Depending upon implementation-specific or other considerations, the packet inspector engine 206 can perform deep packet inspection on packets sent to and from IoT devices. In performing deep packet inspection on packets sent to and from IoT devices, the packet inspector engine 206 can determine transaction data from payloads of data packets. Transaction data includes types and/or subjects of data transmitted as part of a data packet. For example, transaction data of a data packet sent to a thermostat can include an instruction to increase the temperature at the thermostat. Transaction data determined by the packet inspector engine 206 can be used to build historical records for IoT devices. In various implementations, historical records for IoT devices can be formed from an applicable combination of event logs, system logs, and access logs for IoT devices.

In a specific implementation, the packet inspector engine 206 functions to identify destinations and/or sources of sniffed data packets. For example, the packet inspector engine 206 can determine an identification of a destination IoT device by sniffing a data packet destined for the IoT device. In another example, the packet inspector engine 206 can determine a source of a data packet destined to an IoT device. In various implementations, identifications of destinations and/or sources of sniffed data packets can be used, along with transaction data determined from the sniffed data packets, to generate historical records of IoT devices. Depending upon implementation-specific or other considerations, the packet inspector engine 206 can select data packets to perform deep packet inspection on based on at least one of a source of data packets, a destination of data packets, a data packet type of data packets, and data within data packets. For example, all data packets from a particular source can have deep packet inspection performed on them.

The access log management engine 208 functions to maintain an access log for IoT devices. In managing an access log, the access log management engine 208 can create and update an access log to indicate an identification of a specific user interacting with or using an IoT device, when the user interacted with or used the IoT device, whether the user interacted with the IoT device from a remote location or not, and events in interacting with the IoT device, indicating a usage type of the IoT device by the user. In various implementations, an access log can be used to generate a subset of a historical record of an IoT device specific to a user, for use in establishing a normal behavior of a user in interacting with or utilizing a specific IoT device. For example, an access log can be used to establish that a user always interacts with a tablet at 8 o'clock in the evening on weeknights.

In a specific implementation, the access log management engine 208 can maintain an access log for an IoT device based on sniffing of data packets transmitted to and from the IoT device. For example, the access log management engine 208 can maintain an access log for an IoT device based on sniffing of data packets transmitted to and from the IoT device as a user interacts with or utilizes an IoT device. Depending upon implementation-specific or other considerations, the access log management engine 208 can maintain an access log based on deep packet inspection of packets transmitted to and from an IoT device. For example, the access log management engine 208 can use transaction data identified through deep packet inspection of data packets to determine how a user is interacting with an IoT device, e.g. events in interacting with the IoT device. Further in the example, the access log management engine 208 can update an access log to indicate how the user interacted with the IoT device. In another example, the access log management engine 208 can use transaction data identified through deep packet inspection of data packets to determine how a user remotely interacts with an IoT device, e.g. events in interacting with the IoT device remotely.

In a specific implementation, the access log management engine 208 functions to maintain an access log for IoT devices using at least in part, event logs for the IoT devices. In various implementations, the access log management engine 208 can use transaction data identified through deep packet inspection of data packets to determine how a user is interacting with an IoT device, e.g. events in interacting with the IoT device, and an events log to maintain an access log. For example, the access log management engine 208 can compare events determined from transaction data identified through deep packet inspection with a pattern of events, indicated by an event log, to determine how a user is interacting with an IoT device and subsequently update an access log to indicate how the user is interacting with the IoT device. In another example, the access log management engine 208 can compare events determined from transaction data identified through deep packet inspection with a pattern of events associated with different users, indicated by an event log, to determine an identification of a user interacting with an IoT device.

The access log datastore 210 functions to store access log data indicating access logs for use in IoT device management. Access log data stored in the access log datastore 210 can be maintained using packet sniffing of data packets transmitted to and from IoT devices. Depending upon implementation-specific or other considerations, access log data stored in the access log datastore 210 can be maintained using events in interactions with IoT devices determined from transaction data identified through deep packet inspection of data packets transmitted to and from the IoT devices. Further depending upon implementation-specific or other considerations, access log data stored in the access log datastore 210 can be maintained using, at least in part, an event logs for IoT devices.

In an example of operation of the example system shown in FIG. 2, the data flow management engine 204 obtains data packets destined to or sent from an IoT device. In the example of operation of the example system shown in FIG. 2, the packet inspector engine 206 uses deep packet inspection to identify transaction data describing user interactions with the IoT device from the obtained data packets. Further, in the example of operation of the example of operation of the example system shown in FIG. 2, the access log management engine 208 determines events related to user interaction with the IoT device from the transaction data and subsequently maintains an access log, stored as access log data in the access log datastore 210, based on the determined events.

Figure 3:
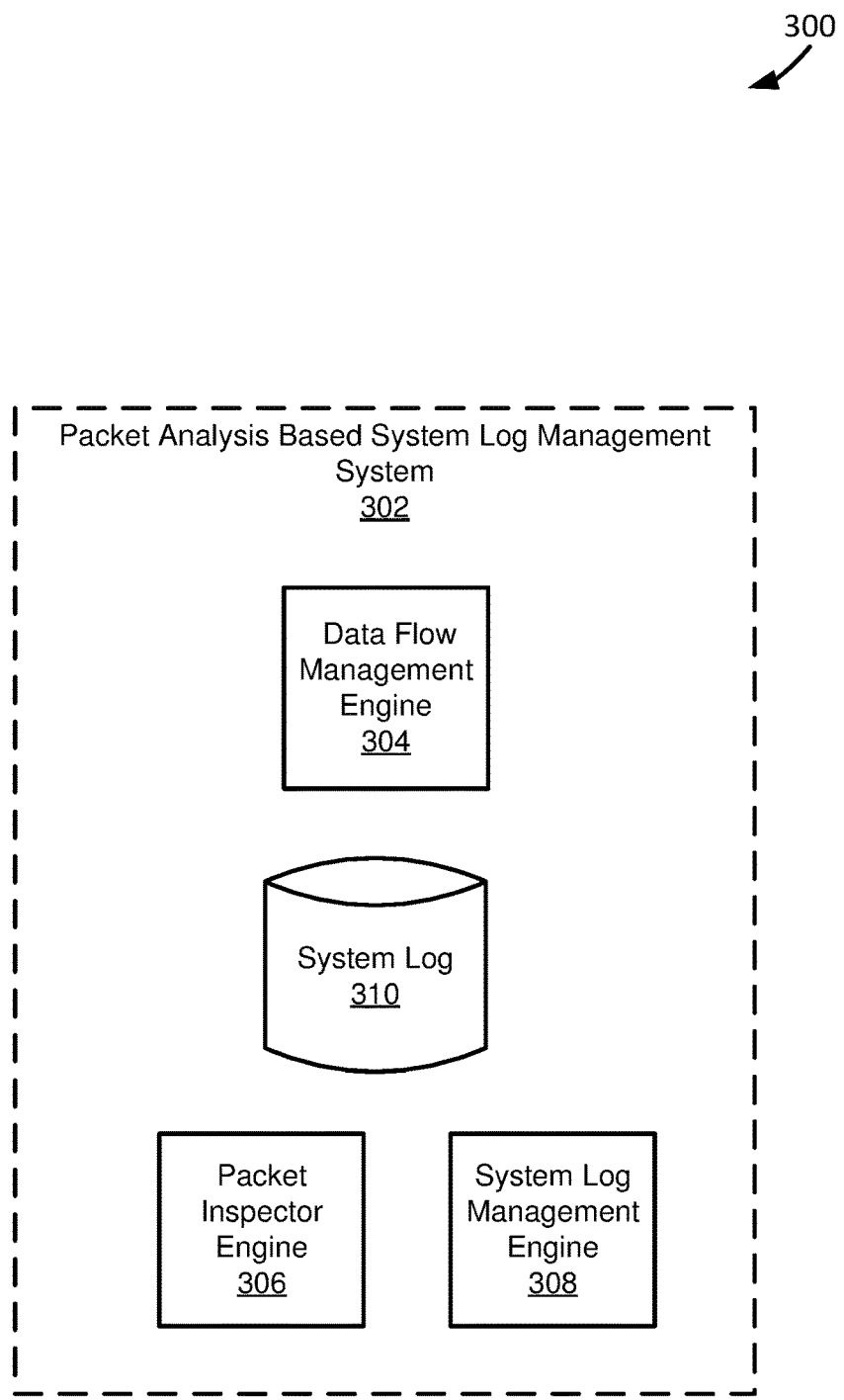
FIG. 3 depicts a diagram of an example packet analysis based system log management system.

FIG. 3 depicts a diagram 300 of an example packet analysis based system log management system 302. The packet analysis based system log management system 302 functions to use packet analysis to manage system logs for IoT devices. The packet analysis based system log management system 302 can be implemented as part of an applicable system for managing IoT devices using packet analysis, such as the packet analysis based IoT device management systems described in this paper. In various implementations, a system log managed by the packet analysis based system log management system 302 can be used to enforce security at IoT devices. Depending upon implementation-specific or other considerations, the packet analysis based system log management system 302 can inspect packets at a location local with respect to IoT devices for which the packet analysis based system log management system 302 manages a system log. For example, the packet analysis based system log management system 302 can be implemented, at least in part, at a local appliance coupled to IoT devices, and subsequently inspect packets sent to and received from the IoT devices at the appliance. Further depending upon implementation-specific or other considerations, the packet analysis based system log management system 302 can inspect packets at a remote location with respect to IoT devices for which the packet analysis based system log management system 302 manages a system log. For example, the packet analysis based system log management system 302 can be implemented at a remote location from IoT devices, e.g. the cloud, and subsequently inspect packets sent to and received from the IoT devices at the remote location, e.g. in-line. In various implementations, when the packet analysis based system log management system 302 is implemented to inspect packets at a remote location with respect to IoT devices, the packet analysis based system log management system 302 can receive packets for inspection through VPN tunneling.

The example packet analysis based system log management system 302 shown in FIG. 3 includes a data flow management engine 304, a packet inspector engine 306, a system log management engine 308, and a system log datastore 310. The data flow management engine 304 functions according to an applicable engine for controlling the flow of data packets to and from IoT devices, such as the data flow management engines described in this paper. In controlling the flow of data packets to and from IoT devices, the data flow management engine 304 can obtain data packets. Further, in controlling the flow of data packets to and from IoT devices, the data flow management engine 304 can forward the data packets to an appropriate destination. For example, if a data packet is addressed to a specific IoT device, then the data flow management engine 304 can forward the data packet to the specific IoT device. In various implementations, the data flow management engine 304 can forward data packets after the packets have been inspected. For example, the data flow management engine 304 can forward data packets after deep packet inspection has been performed on the data packets.

In a specific implementation, the data flow management engine 304 functions to manage forwarding of data packets through VPN tunnels. In managing forwarding of data packets through VPN tunnels, the data flow management engine 304 can forward data packets to appropriate destinations using VPN tunnels. For example, the data flow management engine 304 can forward a data packet using a VPN tunnel, by forwarding the data packet to an ultimate destination through dedicated networking equipment, e.g. routers, for VPN tunneling. In managing forwarding of data packets through VPN tunnels, the data flow management engine 304 can select specific data packets to forward using VPN tunnels. Depending upon implementation-specific or other considerations, the data flow management engine 304 can select data packets to forward through VPN tunneling based, at least in part, on an origin and/or a destination of the data packet. For example, the data flow management engine 304 can forward data packets sent from a specific IoT device through VPN tunneling. Further depending upon implementation-specific or other considerations, the data flow management engine 304 can select data packets to forward through VPN tunneling based, at least in part, on a packet type and/or data contained in data packets. For example, if a data packet relates to login information of a user, then the data flow management engine 304 can forward the packet through VPN tunneling. A packet type and/or data contained in data packets can be determined by an applicable packet sniffing technique, e.g. deep packet inspection.

In a specific implementation, a portion of the data flow management engine 304 is implemented as a local appliance, with respect to IoT devices, and another portion of the data flow management engine 304 is implemented remote from the IoT devices, e.g. in the cloud. In various implementations, a locally implemented portion of the data flow management engine 304 can obtain data packets transmitted from IoT devices and transmit the data packets to a remotely implemented portion of the data flow management engine 304. Depending upon implementation-specific or other considerations, a locally implemented portion of the data flow management engine 304 can obtain data packets transmitted from IoT devices and transmit the data packets to a remotely implemented portion of the data flow management engine 304 through VPN tunneling. Further depending upon implementation-specific or other considerations, data packets transmitted from a locally implemented portion of the data flow management engine 304 to a remotely implemented portion of the data flow management engine 304 can be analyzed at the remote location, e.g. in the cloud.

In a specific implementation, a remotely implemented portion of the data flow management engine 304 can obtain data packets destined to IoT devices and transmit the data packets to a locally implemented portion of the data flow management engine 304. Depending upon implementation-specific or other considerations, a remotely implemented portion of the data flow management engine 304 can obtain data packets destined to IoT devices and transmit the data packets to a locally implemented portion of the data flow management engine 304 through VPN tunneling. Further depending upon implementation-specific or other considerations, data packets transmitted from a remotely implemented portion of the data flow management engine 304 to a locally implemented portion of the data flow management engine 304 can be analyzed at the remote location, e.g. in the cloud, or locally, e.g. at a local appliance.

The packet inspector engine 306 functions according to an applicable engine for sniffing packets sent to and from IoT devices for the purposes of managing IoT devices, such as the packet inspector engines described in this paper. In various implementations, the packet inspector engine 306 functions to sniff packets for purposes of managing security of IoT devices. For example, the packet inspector engine 306 can sniff packets to determine applications being executed at an IoT device which can subsequently be used to determine if improper applications are being executed at or pushed to the IoT device. Depending upon implementation-specific or other considerations, the packet inspector engine 306 can perform deep packet inspection on packets sent to and from IoT devices. In performing deep packet inspection on packets sent to and from IoT devices, the packet inspector engine 306 can determine transaction data of data packets. Transaction data determined by the packet inspector engine 306 can be used to build historical records for IoT devices. In various implementations, historical records for IoT devices can be formed from an applicable combination of event logs, system logs, and access logs for IoT devices.

In a specific implementation, the packet inspector engine 306 functions to identify destinations and/or sources of sniffed data packets. For example, the packet inspector engine 306 can determine an identification of a destination IoT device by sniffing a data packet destined for the IoT device. In another example, the packet inspector engine 306 can determine a source of a data packet destined to an IoT device. In various implementations, identifications of destinations and/or sources of sniffed data packets can be used, along with transaction data determined from the sniffed data packets, to generate historical records for IoT devices. Depending upon implementation-specific or other considerations, the packet inspector engine 306 can select data packets to perform deep packet inspection on based on at least one of a source of data packets, a destination of data packets, a data packet type of data packets, and data within data packets. For example, all data packets from a particular source can have deep packet inspection performed on them.

The system log management engine 308 functions to maintain a system log for IoT devices. In managing a system log, the system log management engine 308 can create and update a system log to indicate an identification of applications and/or operating systems executing or capable of being executed at an IoT device, versions of applications and/or operating systems executing or capable of being executed at an IoT device, and applications and/or operating systems that have been executed at an IoT device, and times and locations of the IoT devices when the applications and/or operating systems were executed at an IoT device. In various implementations, a system log can be used to generate a historical record specific to an IoT device, for use in determining whether a normal application is being executed at an IoT device. For example, a system log can be used to establish that an IoT device usually executes specific applications.

In a specific implementation, the system log management engine 308 functions to maintain a system log for an IoT device based on sniffing of data packets transmitted to and from the IoT device. For example, the system log management engine 308 can maintain a system log for an IoT device based on sniffing of data packets transmitted to and from the IoT device. Depending upon implementation-specific or other considerations, the system log management engine 308 can maintain a system log based on deep packet inspection of packets transmitted to and from an IoT device. For example, the system log management engine 308 can use transaction data identified through deep packet inspection of data packets to determine what applications are executing on an IoT device, e.g. through types of data transmitted from an IoT device. Further in the example, the system log management engine 308 can update a system log to indicate what applications are executing at an IoT device and times the applications are executing at the IoT device.

The system log datastore 310 functions to store system log data indicating system logs for use in IoT device management. System log data stored in the system log datastore 310 can be maintained using packet sniffing of data packets transmitted to and from IoT devices. Depending upon implementation-specific or other considerations, system log data stored in the system log datastore 310 can be maintained using transaction data identified through deep packet inspection of data packets transmitted to and from the IoT devices. For example, system log data can be generated based on a determination of applications executing at an IoT device using transaction data identified through deep packet inspection of data packets transferred to and from the IoT device as part of executing the applications.

In an example of operation of the example system shown in FIG. 3, the data flow management engine 304 obtains data packets destined to or sent from an IoT device. In the example of operation of the example system shown in FIG. 3, the packet inspector engine 306 uses deep packet inspection to identify transaction data from the obtained data packets. Further, in the example of operation of the example system shown in FIG. 3, the system log management engine 308 determines applications executing at the IoT device from the transaction data and subsequently maintains a system log, stored as system log data in the system log datastore 310, indicating the applications executing at the IoT device and when the applications were executing at the IoT device.

Figure 4:
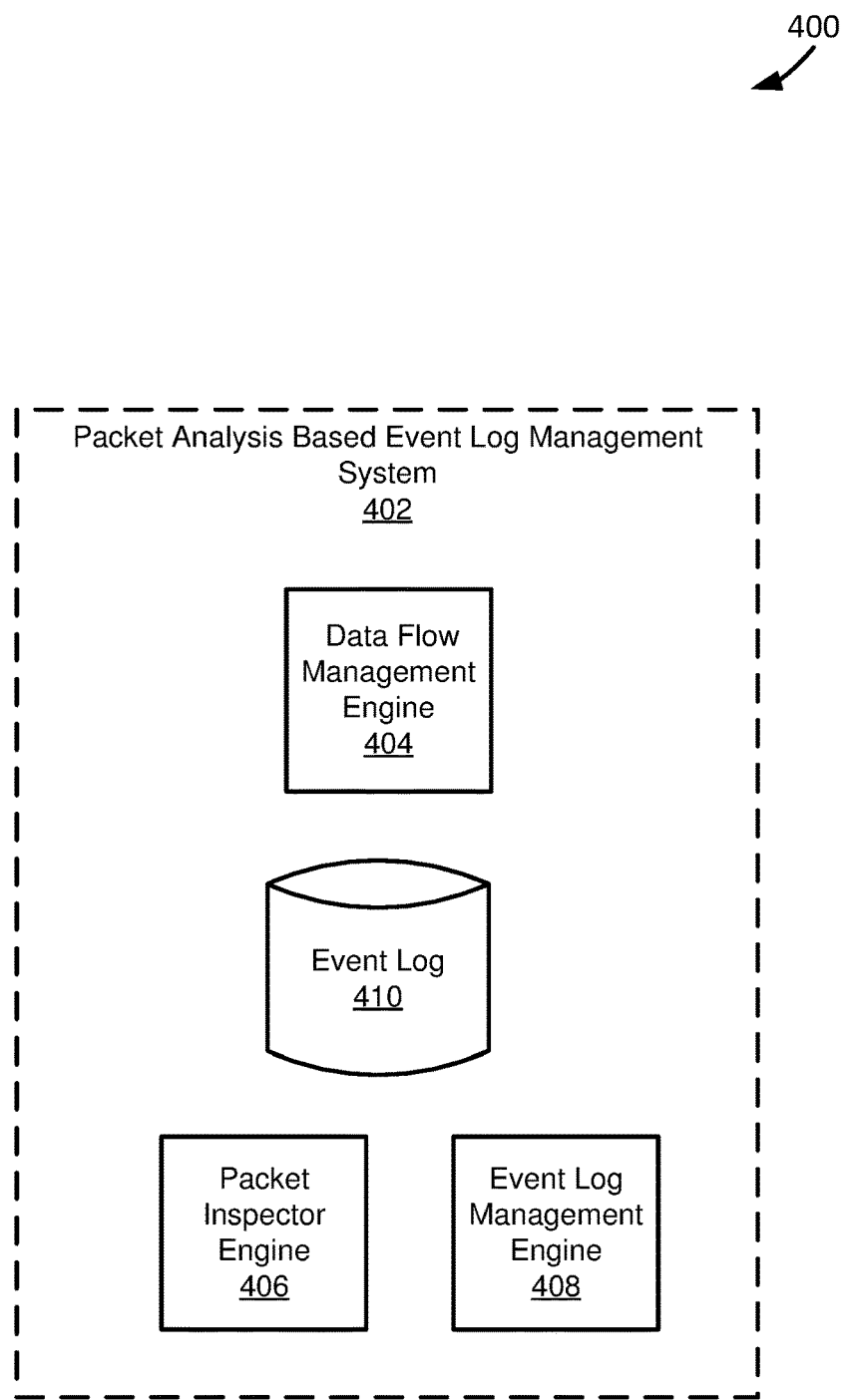
FIG. 4 depicts a diagram of an example packet analysis based event log management system.

FIG. 4 depicts a diagram 400 of an example packet analysis based event log management system 402. The packet analysis based event log management system 402 functions to use packet analysis to manage event logs for IoT devices. The packet analysis based event log management system 402 can be implemented as part of an applicable system for managing IoT devices using packet analysis, such as the packet analysis based IoT device management systems described in this paper. In various implementations, an event log managed by the packet analysis based event log management system 402 can be used to enforce security at IoT devices. Depending upon implementation-specific or other considerations, the packet analysis based event log management system 402 can inspect packets at a location local with respect to IoT devices for which the packet analysis based event log management system 402 manages an event log. For example, the packet analysis based event log management system 402 can be implemented, at least in part, at a local appliance coupled to IoT devices, and subsequently inspect packets sent to and received from the IoT devices at the appliance. Further depending upon implementation-specific or other considerations, the packet analysis based event log management system 402 can inspect packets at a remote location with respect to IoT devices for which the packet analysis based event log management system 402 manages an event log. For example, the packet analysis based event log management system 402 can be implemented at a remote location from IoT devices, e.g. the cloud, and subsequently inspect packets sent to and received from the IoT devices at the remote location, e.g. in-line. In various implementations, when the packet analysis based event log management system 402 is implemented to inspect packets at a remote location with respect to IoT devices, the packet analysis based event log management system 402 can receive packets for inspection through VPN tunneling.

The example packet analysis based event log management system 402 shown in FIG. 4 includes a data flow management engine 404, a packet inspector engine 406, an event log management engine 408, and an event log datastore 410. The data flow management engine 404 functions according to an applicable engine for controlling the flow of data packets to and from IoT devices, such as the data flow management engines described in this paper. In controlling the flow of data packets to and from IoT devices, the data flow management engine 404 can obtain data packets. Further, in controlling the flow of data packets to and from IoT devices, the data flow management engine 404 can forward the data packets to an appropriate destination. For example, if a data packet is addressed to a specific IoT device, then the data flow management engine 404 can forward the data packet to the specific IoT device. In various implementations, the data flow management engine 404 can forward data packets after the packets have been inspected. For example, the data flow management engine 404 can forward data packets after deep packet inspection has been performed on the data packets.

In a specific implementation, the data flow management engine 404 functions to manage forwarding of data packets through VPN tunnels. In managing forwarding of data packets through VPN tunnels, the data flow management engine 404 can forward data packets to appropriate destinations using VPN tunnels. For example, the data flow management engine 404 can forward a data packet using a VPN tunnel, by forwarding the data packet to an ultimate destination through dedicated networking equipment, e.g. routers, for VPN tunneling. In managing forwarding of data packets through VPN tunnels, the data flow management engine 404 can select specific data packets to forward using VPN tunnels. Depending upon implementation-specific or other considerations, the data flow management engine 404 can select data packets to forward through VPN tunneling based, at least in part, on an origin and/or a destination of the data packet. For example, the data flow management engine 404 can forward data packets sent from a specific IoT device through VPN tunneling. Further depending upon implementation-specific or other considerations, the data flow management engine 404 can select data packets to forward through VPN tunneling based, at least in part, on a packet type and/or data contained in data packets. For example, if a data packet relates to login information of a user, then the data flow management engine 404 can forward the packet through VPN tunneling. A packet type and/or data contained in data packets can be determined by an applicable packet sniffing technique, e.g. deep packet inspection.

In a specific implementation, a portion of the data flow management engine 404 is implemented as a local appliance, with respect to IoT devices, and another portion of the data flow management engine 404 is implemented remote from the IoT devices, e.g. in the cloud. In various implementations, a locally implemented portion of the data flow management engine 404 can obtain data packets transmitted from IoT devices and transmit the data packets to a remotely implemented portion of the data flow management engine 404. Depending upon implementation-specific or other considerations, a locally implemented portion of the data flow management engine 404 can obtain data packets transmitted from IoT devices and transmit the data packets to a remotely implemented portion of the data flow management engine 404 through VPN tunneling. Further depending upon implementation-specific or other considerations, data packets transmitted from a locally implemented portion of the data flow management engine 404 to a remotely implemented portion of the data flow management engine 404 can be analyzed at the remote location, e.g. in the cloud.

In a specific implementation, a remotely implemented portion of the data flow management engine 404 can obtain data packets destined to IoT devices and transmit the data packets to a locally implemented portion of the data flow management engine 404. Depending upon implementation-specific or other considerations, a remotely implemented portion of the data flow management engine 404 can obtain data packets destined to IoT devices and transmit the data packets to a locally implemented portion of the data flow management engine 404 through VPN tunneling. Further depending upon implementation-specific or other considerations, data packets transmitted from a remotely implemented portion of the data flow management engine 404 to a locally implemented portion of the data flow management engine 404 can be analyzed at the remote location, e.g. in the cloud, or locally, e.g. at a local appliance.

The packet inspector engine 406 functions according to an applicable engine for sniffing packets sent to and from IoT devices for the purposes of managing IoT devices, such as the packet inspector engines described in this paper. In various implementations, the packet inspector engine 406 functions to sniff packets for purposes of managing security of IoT devices. For example, the packet inspector engine 406 can sniff packets to determine events occurring at IoT devices. Depending upon implementation-specific or other considerations, the packet inspector engine 406 can perform deep packet inspection on packets sent to and from IoT devices. In performing deep packet inspection on packets sent to and from IoT devices, the packet inspector engine 406 can determine transaction data of data packets. Transaction data determined by the packet inspector engine 406 can be used to build historical records for IoT devices. In various implementations, historical records for IoT devices can be formed from an applicable combination of event logs, system logs, and access logs for IoT devices.

In a specific implementation, the packet inspector engine 406 functions to identify destinations and/or sources of sniffed data packets. For example, the packet inspector engine 406 can determine an identification of a destination IoT device by sniffing a data packet destined for the IoT device. In another example, the packet inspector engine 406 can determine a source of a data packet destined to an IoT device. In various implementations, identifications of destinations and/or sources of sniffed data packets can be used, along with transaction data determined from the sniffed data packets, to generate historical records of IoT devices. Depending upon implementation-specific or other considerations, the packet inspector engine 406 can select data packets to perform deep packet inspection on based on at least one of a source of data packets, a destination of data packets, a data packet type of data packets, and data within data packets. For example, all data packets from a particular source can have deep packet inspection performed on them.

The event log management engine 408 functions to maintain an event log for IoT devices. In managing an event log, the event log management engine 408 can create and update an event log to indicate events occurring at an IoT device, times events occurred at the IoT device, and destinations and sources of data traffic related to events at an IoT device. An event log can be used to form part of a historical record of IoT devices. In various implementations, an event log can be used to generate a historical record specific to an IoT device, for use in determining normal operating behavior of an IoT device. For example, an event log can be used to establish that an IoT device usually performs a specific function at a set time of day.

In a specific implementation, the event log management engine 408 functions to maintain an event log for an IoT device based on sniffing of data packets transmitted to and from the IoT device. For example, the event log management engine 408 can maintain an event log for an IoT device based on sniffing of data packets transmitted to and from the IoT device. Depending upon implementation-specific or other considerations, the event log management engine 408 can maintain an event log based on deep packet inspection of packets transmitted to and from an IoT device. For example, the event log management engine 408 can use transaction data identified through deep packet inspection of data packets to determine what events are occurring at an IoT device, e.g. through types of data transmitted from an IoT device. Further in the example, the event log management engine 408 can update an event log to indicate what events are occurring at an IoT device and times the events are occurring at the IoT device.

The event log datastore 410 functions to store event log data indicating event logs for use in IoT device management. Event log data stored in the event log datastore 410 can be maintained using packet sniffing of data packets transmitted to and from IoT devices. Depending upon implementation-specific or other considerations, event log data stored in the event log datastore 410 can be maintained using transaction data identified through deep packet inspection of data packets transmitted to and from the IoT devices. For example, event log data can be generated based on a determination of events occurring at an IoT device using transaction data identified through deep packet inspection of data packets transferred to and from the IoT device as part of occurrences of the events.

In an example of operation of the example system shown in FIG. 4, the data flow management engine 404 obtains data packets destined to or sent from an IoT device. In the example of operation of the example system shown in FIG. 4, the packet inspector engine 406 uses deep packet inspection to identify transaction data from the obtained data packets. Further, in the example of operation of the example system shown in FIG. 4, the event log management engine 408 determines events occurring at the IoT device from the transaction data and subsequently maintains an event log, stored as event log data in the event log datastore 410, indicating the events occurring at the IoT device and when the events occurred at the IoT device.

Figure 5:
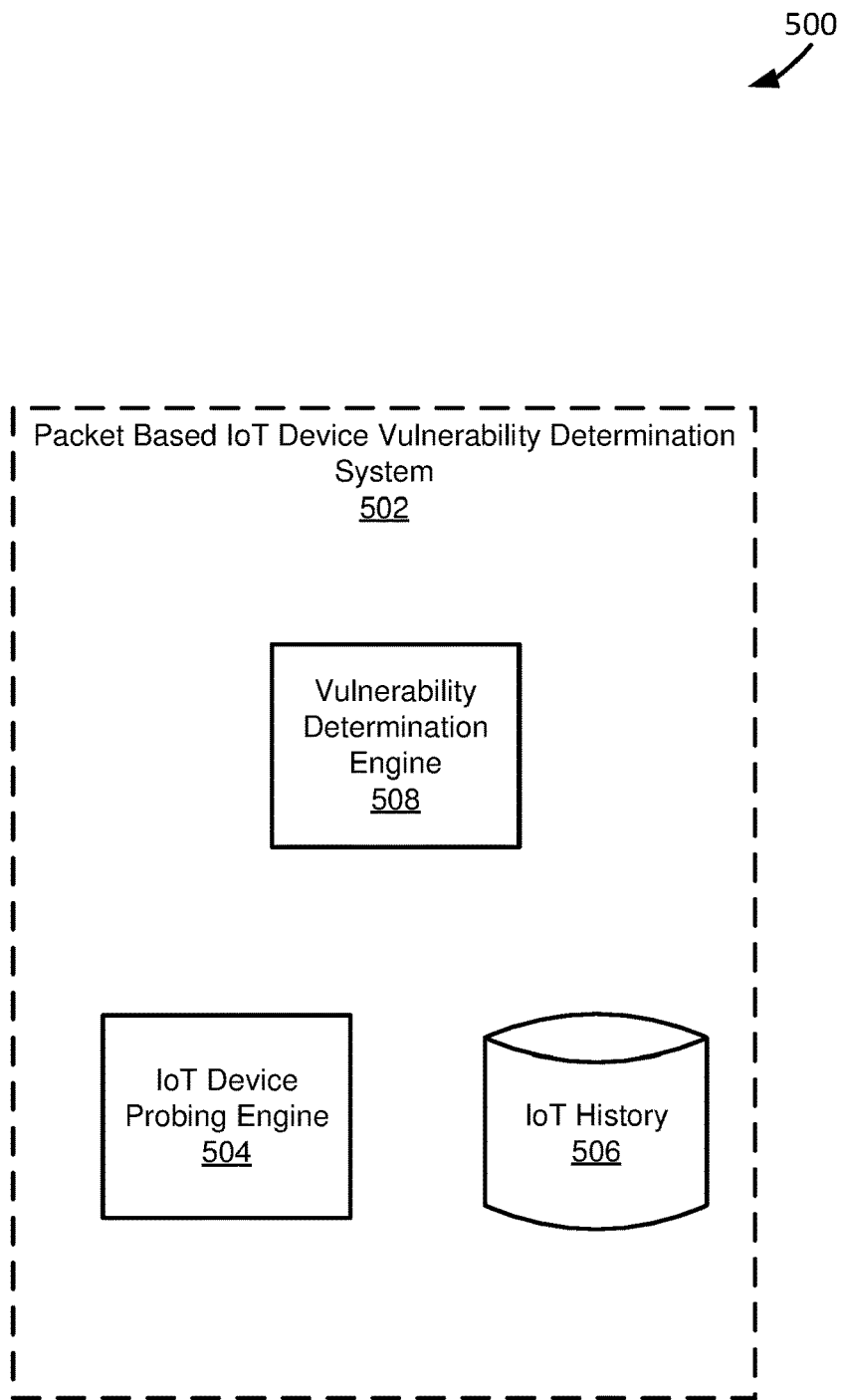
FIG. 5 depicts a diagram of an example of a packet based IoT device vulnerability system.

FIG. 5 depicts a diagram 500 of an example of a packet based IoT device vulnerability system 502. The packet based IoT device vulnerability determination system 502 functions to determine vulnerability of IoT devices based, at least in part, on packet inspection. The packet based IoT device vulnerability determination system 502 can be implemented as part of an applicable system for managing IoT devices using packet analysis, such as the packet analysis based IoT device management systems described in this paper. In various implementations, a vulnerability determination for IoT devices can be used to enforce security at the IoT devices. For example, if the packet based IoT device vulnerability determination system 502 determines that an IoT device is vulnerable to a specific attack, or has a vulnerability level above a vulnerability threshold, then the packet based IoT device vulnerability determination system 502 can instruct an applicable engine to stop the flow of data to and from the IoT device.

In a specific implementation, the packet based IoT device vulnerability determination system 502 functions to be implemented, at least in part, at a location local with respect to IoT devices for which the packet based IoT vulnerability determination system 502 determines vulnerabilities. For example, the packet based IoT device vulnerability determination system 502 can be implemented, at least in part, at a local appliance coupled to IoT devices.

In a specific implementation, the packet based IoT device vulnerability determination system 502 can determine device vulnerabilities at a remote location with respect to IoT devices. For example, the packet based IoT device vulnerability determination system can be implemented at a remote location from IoT devices, e.g. the cloud, and subsequently perform vulnerability analysis at the remote location.

The example packet based IoT device vulnerability determination system 502 shown in FIG. 5 includes an IoT device probing engine 504, an IoT device historic datastore 506, and a vulnerability determination engine 508. The IoT device probing engine 504 functions to probe an IoT device for purposes of determining vulnerability of the IoT device. In various implementations, the IoT device probing engine 504 can probe an IoT device by sending data packets to the IoT device. For example, the IoT device probing engine 504 can send a packet for gaining access to an IoT device to see if a user id and/or password for accessing the IoT device has changed. Further in the example, if the IoT device probing engine 504 fails to gain access to an IoT device with a user id and/or password that is associated with accessing the IoT device, then it can be determined that the user id and/or password for accessing the IoT device has changed. In another example, the IoT device probing engine 504 can send a packet for gaining access to an IoT device using a default user id and/or password. Further in the example, if the IoT device probing engine 504 can gain access to the IoT device using the default user id and/or password, it can be determined that the IoT device is vulnerable to attacks and hacks. In various implementations, packets communicated between the IoT device probing engine 504 and an IoT device can be used to update event logs, system logs, and access logs, and subsequently IoT device historic data for the IoT device in real-time, for purposes of managing security of the IoT device, e.g. determining a vulnerability level of the IoT device.

In a specific implementation, the IoT device probing engine 504 functions to monitor ports of an IoT device to determine device vulnerability. In various implementations, the IoT device probing engine 504 can send packets to an IoT device and observe ports used by the IoT device to receive and transmit in response to the packets to determine vulnerability of the IoT device. For example, the IoT device probing engine 504 can communicate with an IoT device over an incorrect or less secure port, signifying that the IoT device is vulnerable to attack.

In a specific implementation, the IoT device probing engine 504 functions to communicate with an IoT device in a simulation of an attack on the IoT device. Manners in which an IoT device in response to a simulation of an attack on the IoT device can be used to determine a vulnerability of the IoT device. For example, if the IoT device probing engine 504 simulates a ping flood, and the IoT device continues to respond to the ping flood, it can be determined that the IoT device is vulnerable to attacks.

In a specific implementation, the IoT device probing engine 504 functions to send packets to an IoT device to force the IoT device to respond. Traffic sent from an IoT device in response to forcing by the IoT device probing engine 504 can be studied to determine vulnerability of the IoT device. For example, if an IoT device responds with information relating to accessing the IoT device, as determined by an applicable method, such as deep packet inspection, then it can be determined that the IoT device is vulnerable.

The IoT history datastore 506 functions to store IoT history data indicating historical records of IoT device operation. IoT history data can be updated in real-time to include event logs, system logs, and access logs. For example, IoT history data stored in the IoT history datastore 506 can include event logs for an IoT device that are updated in real-time as the IoT device continues to operate. In various implementations, IoT history data stored in the IoT history datastore 506 can be generated using packet analysis. For example, IoT history data stored in the IoT history datastore 506 can be generated through packet sniffing, e.g. analyzing headers of data packets sent to and from IoT devices. In various implementations, IoT history data stored in the IoT history datastore 506 can be generated through deep packet inspection of data packets sent to and from IoT devices. For example, IoT history data stored in the IoT history datastore 506 can be generated from transaction data identified through deep packet inspection of data packets sent to and from IoT devices. IoT history data stored in the IoT history datastore 506 can indicate determined vulnerabilities of IoT devices.

The vulnerability determination engine 508 functions to determine a vulnerability of IoT devices. In various implementations, the vulnerability determination engine 508 determines a vulnerability of IoT devices based on analysis of data packets transmitted to and from IoT devices. For example, if an IoT device is transmitting data packets including access credentials for accessing the IoT device, then the vulnerability determination engine 508 can determine that the IoT device is vulnerable. Depending upon implementation-specific or other considerations, the vulnerability determination engine 508 can assign a vulnerability score to an IoT device indicating a vulnerability level of the IoT device. The vulnerability determination engine 508 can assign a vulnerability score to an IoT device based on how well an IoT device performs according to vulnerability factors. Vulnerability factors include aspects of operation of an IoT device that make an IoT device less risky and more secure to being hacked. For example, if an IoT device performs well against a simulated attack but is still transmitting sensitive data, then the vulnerability determination engine 508 can assign the IoT device a vulnerability score of 50.

In a specific implementation, the vulnerability determination engine 508 functions to determine a vulnerability of an IoT device based on a response by the IoT device to a simulated attack. In various implementations, the vulnerability determination engine 508 can determine a response by an IoT device to a simulated attack and subsequently determine a vulnerability of the IoT device based on the response. Further, in various implementations, the vulnerability determination engine 508 can determine a response by an IoT device to a simulated attack by analyzing data packets sent from the IoT device and/or traffic flow patterns from the IoT device in response to the attack. For example, if an IoT device is subjected to a simulated ping flood attack, the vulnerability determination engine 508 can determine that the IoT device is failing to handle the attack if the IoT device is continually responding to the ping flood attack.

In a specific implementation, the vulnerability determination engine 508 functions to determine a vulnerability of an IoT device by analyzing data traffic forced from the IoT device. Forced traffic analyzed by the vulnerability determination engine 508 can be forced from an IoT device by sending an active packet to the IoT device, thereby forcing the IoT device to respond. In various implementations, the vulnerability determination engine can sniff forced data packets transmitted by an IoT device to determine vulnerability of the IoT device. Further, in various implementations, the vulnerability determination engine 508 can use deep packet inspection to analyze forced data packets transmitted by an IoT device to determine vulnerability of the IoT device. For example, the vulnerability determination engine 508 can use deep packet inspection to identify transaction data from forced data packets transmitted by an IoT device, and identify events from the transaction data to determine vulnerability of the IoT device.

In a specific implementation, the vulnerability determination engine 508 functions to determine a vulnerability of an IoT device based on historical records of IoT devices.

Historical records used by the vulnerability determination engine 508 can be updated in real-time to reflect the real-time operation of IoT devices. In various implementations, the vulnerability determination engine 508 can determine vulnerability of an IoT device based on an identification of IoT devices being targeted. For example, the vulnerability determination engine 508 can determine an IoT device is vulnerable if it is a subject of a random scan. Further in the example, whether the IoT device is the subject of a random scan can be determined by the vulnerability determination engine 508 using event logs of IoT devices, as indicated by historical record of the IoT devices.

In a specific implementation, the vulnerability determination engine 508 functions to determine vulnerability of an IoT device based on determined access credentials of the IoT device. In various implementations, access credential of an IoT device can be determined by probing the IoT device with data packets. For example, it can be determined if an IoT device is using default access credentials, e.g. a default user id and password, for providing access to the IoT device by sending data packets utilizing the default access credentials to the IoT device to gain access. In various implementations, the vulnerability determination engine 508 can determine that an IoT device is vulnerable if it determines the IoT device is granting access through default access credentials.

In an example of operation of the example system shown in FIG. 5, the IoT device probing engine 504 probes an IoT device by sending data packets to the IoT device. In the example of operation the vulnerability determination engine 508 determines a vulnerability of the IoT device based on a response of the IoT device to the probing by the IoT device probing engine 504. Further, in the example of operation of the example system shown in FIG. 5, the IoT history datastore 506 stores IoT history data indicating historical records of a plurality of IoT devices including the IoT device. In the example of operation of the example system shown in FIG. 5, the vulnerability determination engine 508 determines vulnerability of the IoT device based on the historical records indicated by IoT history data stored in the IoT history datastore 506.

Figure 6:
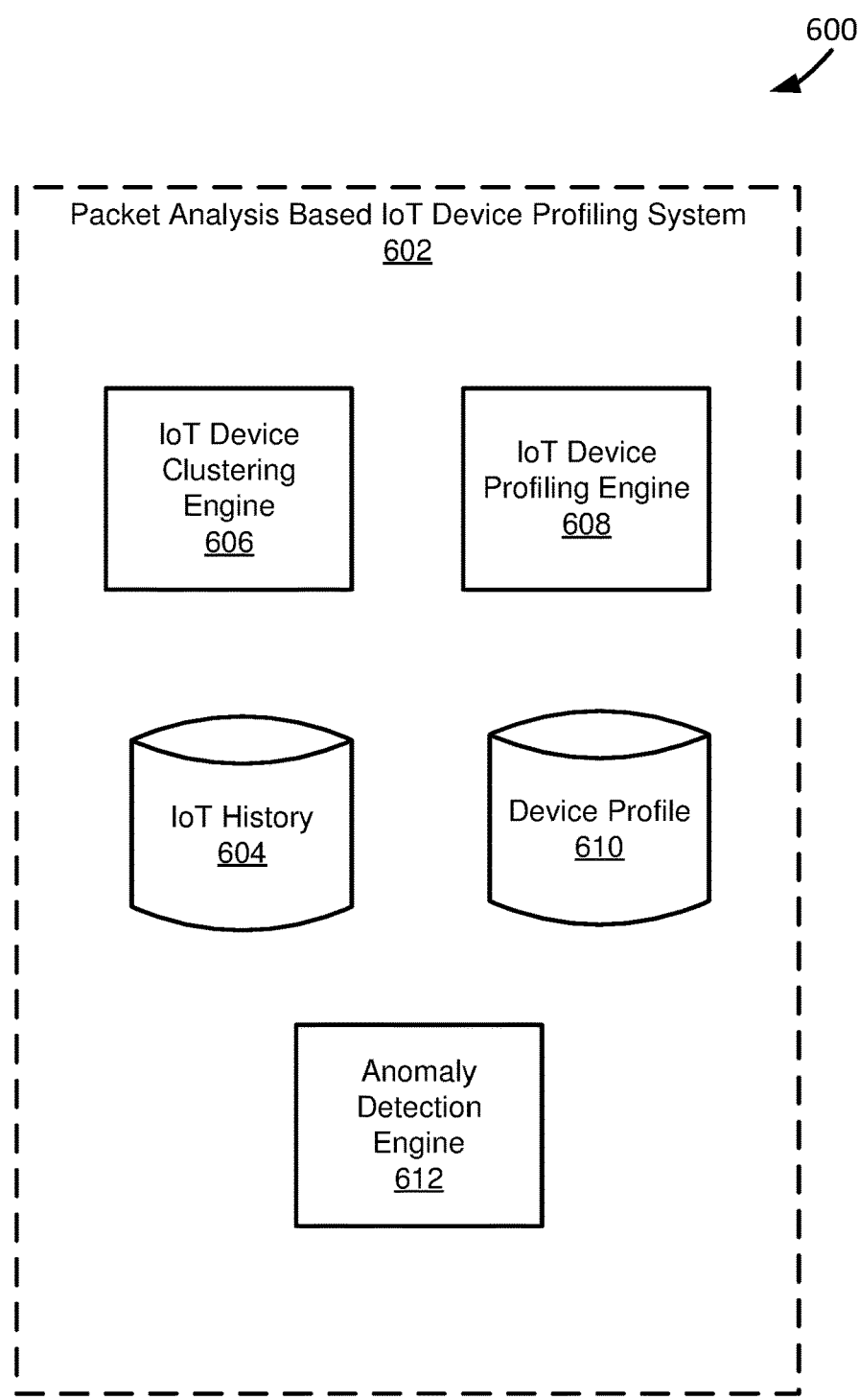
FIG. 6 depicts a diagram of an example of a packet analysis based IoT device profiling system.

FIG. 6 depicts a diagram 600 of an example of a packet analysis based IoT device profiling system 602. The packet based IoT device profiling system 602 functions to profile IoT devices based, at least in part, on packet inspection. In various implementations, profiling of IoT devices by the packet analysis based IoT device profiling system 602 can be used in the providing of analytics for purposes of managing the IoT devices. A profile of an IoT device, as used in this paper, can include information relating to operation of an IoT device, such as how an IoT device operates, events that occur during operation of an IoT device, access information including who accessed an IoT device, and times the user accessed an IoT device, normal behavior of an IoT device or user, discovered abnormal behavior of an IoT device or user, vulnerabilities of an IoT device, and applications and operating systems executing at or capable of being executed at an IoT device. The packet analysis based IoT device profiling system 602 can be implemented as part of an applicable system for managing IoT devices using packet analysis, such as the packet analysis based IoT device management systems described in this paper. In various implementations, profiles of IoT devices created by the IoT device profiling system 602 can be used to enforce security at the IoT devices. Depending upon implementation-specific or other considerations, profiles of IoT devices created by the IoT device profiling system 602 can be used to enforce security to an outside/third party IoT management entity.

In a specific implementation, the packet analysis based IoT device profiling system 602 functions to be implemented, at least in part, at a location local with respect to IoT devices. The packet analysis based IoT device profiling system 602 can be implemented, at least in part, at a local location with respect to IoT devices profiled by the packet analysis based IoT device profiling system 602. For example, the packet analysis based IoT device profiling system 602 can be implemented, at least in part, at a local appliance coupled to IoT devices. In a specific implementation, the packet analysis based IoT device profiling system 602 can profile devices at a remote location with respect to IoT devices, e.g. the cloud.

The example packet analysis based IoT device profiling system 602 shown in FIG. 6 includes an IoT history datastore 604, an IoT device clustering engine 606, an IoT device profiling engine 608, a device profile datastore 610, and an anomaly detection engine 612. The IoT history datastore 604 functions according to an applicable datastore for storing IoT history data, such as the IoT history datastores described in this paper. IoT history data stored in the IoT history datastore 604 can be updated in real-time to include event logs, system logs, and access logs. For example, IoT history data stored in the IoT history datastore 606 can include event logs for an IoT device that are updated in real-time as the IoT device continues to operate. In various implementations, IoT history data stored in the IoT history datastore 606 can be generated using packet analysis. For example, IoT history data stored in the IoT history datastore 606 can be generated through packet sniffing, e.g. analyzing headers of data packets sent to and from IoT devices. In various implementations, IoT history data stored in the IoT history datastore 606 can be generated through deep packet inspection of data packets sent to and from IoT devices. For example, IoT history data stored in the IoT history datastore 606 can be generated from transaction data identified through deep packet inspection of data packets sent to and from IoT devices.

The IoT device clustering engine 606 functions to cluster IoT devices into clusters for purposes of profiling the IoT devices. In clustering IoT devices, the IoT device clustering engine 606 can aid in a profiling mechanism to create a detailed profile for IoT devices. The IoT device clustering engine 606 can cluster IoT devices based on clustering factors. Clustering factors include applicable factors related to operation of IoT devices for use in grouping IoT devices. Example clustering factors include device types, attributes of IoT devices, functionalities of IoT device, operating systems and applications executing at or capable of being executed at IoT devices, entities associated with IoT devices, users who interact with IoT devices, and systems and devices with which the IoT devices communicate. For example, the IoT device clustering engine 606 can cluster IoT devices at an enterprise location into a single cluster.

In a specific implementation, the IoT device clustering engine 606 functions to receive regarding new clustering factors and subsequently cluster the devices according to the new clustering factors. For example, the IoT device clustering engine 606 can receive information indicating a new IoT device and/or IoT device type and subsequently cluster IoT devices according to the new IoT device and/or IoT device type. In various implementations, the IoT device clustering engine 606 can provide an interface through which an applicable entity, e.g. an administrator, can manually input new clustering factors.

The IoT device profiling engine 608 functions to generate profiles for IoT devices. In various implementations, the IoT device profiling engine 608 can create profiles for a specific IoT device or for a cluster of IoT devices. For example, the IoT device profiling engine 608 can create a profile for a single IoT device at an enterprise location and for a plurality of IoT devices within an enterprise location. Depending upon implementation-specific or other considerations, a profile generated by the IoT device profiling engine 608 can include a device map. A device map includes a map showing systems and devices with which an IoT device communicates. For example, a device map can include other IoT devices with which an IoT device communicates. In another example, a device map can include sources across the Internet with which an IoT device communicates. Further depending upon implementation-specific or other considerations, the IoT device profiling engine 608 can generate profiles for IoT devices that are specific to a time of year. For example, the IoT device profiling engine 608 can model profiles of a thermostat for summer and winter months based on changing operation of the thermostat during summer and winter months. In various implementations, the IoT device profiling engine 608 can use machine learning to improve its models used in profiling devices over time as it continues to profile IoT device.

In a specific implementation, the IoT device profiling engine 608 can generate IoT device profiles based, at least in part, on IoT historical records. Depending upon implementation-specific or other considerations, the IoT device profiling engine 608 can generate an IoT device profile based, at least in part, on an event log included as part of IoT historical records. For example, the IoT device profiling engine 608 can generate an IoT device profile, using an event log, to indicate how an IoT device operates. Further depending upon implementation-specific or other considerations, the IoT device profiling engine 608 can generate an IoT device profile based, at least in part, on an access log included as part of IoT historical records. For example, the IoT device profiling engine 608 can generate an IoT device profile, using an access log, to indicate how a specific user interacts with an IoT device as part of operation of the IoT device. Depending on implementation-specific or other considerations, the IoT device profiling engine 608 can generate an IoT device profile based, at least in part, on a system log included as part of IoT historical records. For example, the IoT device profiling engine 608 can generate an IoT device profile, using a system log, to indicate an identification of an IoT device and applications executing at the IoT device.

In a specific implementation, the IoT device profiling engine 608 can generate IoT device profiles based, at least in part, on vulnerabilities of IoT devices. The IoT device profiling engine 608 can generate IoT device profiles based, at least in part, in vulnerabilities of IoT devices determined by an applicable system for determining IoT device vulnerabilities, such as the packet based IoT device vulnerability determination systems described in this paper. Depending upon implementation-specific or other considerations, the IoT device profiling engine 608 can generate IoT device profiles based on probing of IoT devices. For example, if an IoT device performs poorly in response to a simulated attack, then the IoT device profiling engine 608 can generate a device profile for the IoT device indicating that the IoT device is vulnerable to the attack. Further depending upon implementation-specific or other considerations, the IoT device profiling engine 608 can generate IoT device profiles based on determined vulnerabilities of IoT devices using historical records of the IoT devices. For example, if historical records, e.g. event logs, indicate that an IoT device is the subject of a random scanning by a user, then the IoT device profiling engine 608 can generate an IoT device profile for the IoT device indicating that it has been the subject of random scanning, and thus vulnerable.

In a specific implementation, the IoT device profiling engine 608 can model baseline behavior of IoT devices, as included as part of device profiles of the IoT devices. The IoT device profiling engine 608 can model baseline behavior of IoT devices based on historical records of IoT devices. Baseline behavior includes ways an IoT device typical acts, users a device interacts with, and applications and/or operating system that are typically executed at the IoT device. For example, if a thermostat raises the temperature at five in the evening every day, as indicated by an events log for the thermostat, then the IoT device profiling engine 608 can model a baseline behavior of the IoT device to indicate raising of the temperature at five in the evening every day. Depending upon implementation-specific or other considerations, the IoT device profiling engine 608 can model baseline behavior of an IoT device specific to a user. For example, if a user interacts with a device in a similar fashion repeatedly, then the IoT device profiling engine 608 can determine a baseline behavior specific to the user and the IoT device is the repeated interactions between the user and the IoT device.

In a specific implementation, the IoT device profiling engine 608 functions to include detected anomalies into a device profile for IoT devices. An anomaly is when an IoT device behaves differently from a modeled baseline behavior of an IoT device. For example, if an IoT device regularly interacts with a device and begins interacting with another device, then an anomaly at the IoT device can be detected. The IoT device profiling engine 608 can update device profiles in real-time as anomalies are detected in real-time.

In a specific implementation, the IoT device profiling engine 608 functions to provide device profiles to an interface for presentation. In various implementations, the IoT device profiling engine 608 can provide the device profiles to an interface in a format that is readable to a human. For example, the IoT device profiling engine 608 can provide device maps illustrating systems with which an IoT device is interacting that a human is capable of reading.

The device profile datastore 610 functions to store device profile data indicating device profiles of IoT devices. Device profiles indicated by device profile data stored in the device profile datastore 610 can be generated from historical records of IoT devices. In various implementations, device profile data stored in the device profile datastore 610 can include anomalies in IoT device behavior, vulnerabilities of IoT devices, and/or device maps specifying systems or devices IoT devices are interacting with.

The anomaly detection engine 612 functions to determine anomalies in IoT device behavior. The anomaly detection engine 612 can determine anomalies in real-time as events occur at an IoT device. In various implementations, the anomaly detection engine 612 can determine anomalies based on historical records of IoT devices and profiles of IoT devices. For example, the anomaly detection engine 612 can determine currently occurring events at an IoT device from a historical record of an IoT device and compare the currently occurring events with baseline behaviors of an IoT device to determine whether a device is behaving abnormally. Depending upon implementation-specific or other considerations, the anomaly detection engine 612 can instruct an applicable engine for controlling data flow at an IoT device, such as the data flow management engines described in this paper, to regulate or stop flow of data to and from an IoT device in response to a detected anomaly at an IoT device. For example, if the anomaly detection engine 612 determines that an IoT device is communicating with a new device, then the anomaly detection engine can instruct an applicable engine for controlling data flow at an IoT device, such as the data flow management engines described in this paper, to stop the flow of data to and from the IoT device. Further depending upon implementation-specific or other considerations, the anomaly detection engine 612 can instruct an applicable engine for controlling data flow at an IoT device, such as the data flow management engines described in this paper, to quarantine the IoT device, e.g. move the device to a different virtual LAN.

In an example of operation of the example system shown in FIG. 6, the IoT history datastore 604 stores IoT history data indicating historical records of IoT devices. In the example of operation of the example system shown in FIG. 6, the IoT device clustering engine 606 clusters IoT devices into clusters based on the historical records of the IoT devices indicated by IoT history data stored in the IoT history datastore 604. Further, in the example of operation of the example system shown in FIG. 6, the IoT device profiling engine 608 profiles the IoT devices according to the clusters into device profiles using the historical records of the IoT devices indicated by IoT history data stored in the IoT history datastore 604. In the example of operation of the example system shown in FIG. 6, the device profile datastore stores device profile data indicating device profiles determined by the IoT device profiling engine 608. Additionally, in the example of operation of the example system shown in FIG. 6, the anomaly detection engine 612 determines abnormalities in operational characteristics of the IoT devices using IoT history data stored in the IoT history datastore 604 and device profiles of the IoT devices indicated by device profiles data stored in the device profile datastore 610.

Figure 7:
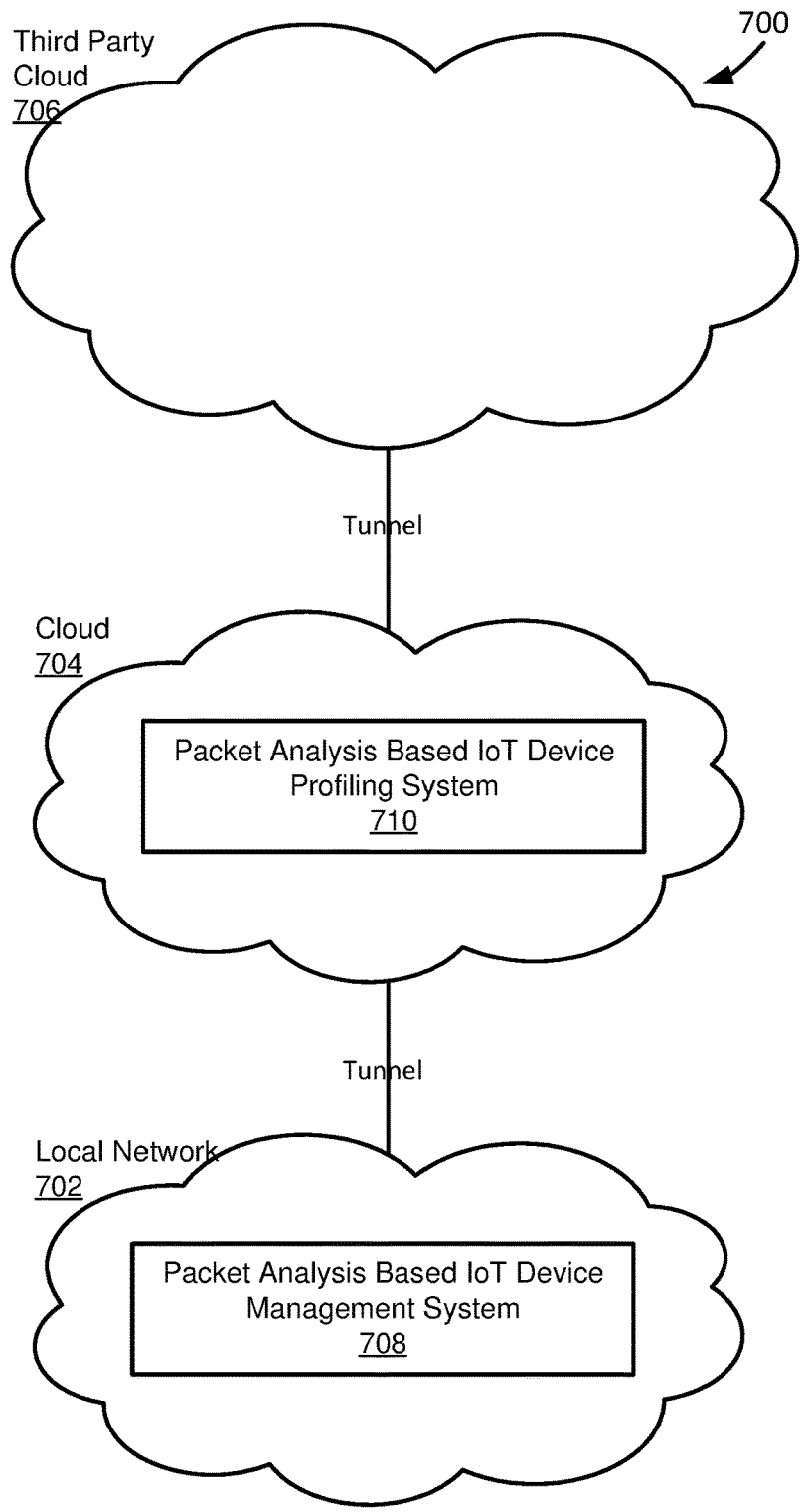
FIG. 7 depicts a diagram of an example of a system for packet analysis based IoT device management.

FIG. 7 depicts a diagram 700 of an example of a system for packet analysis based IoT device management. The example system shown in FIG. 7 includes a local network 702, a cloud 704, and a third party cloud 706. The local network 702 is formed by at least one managed IoT device and a local appliance. The local network 702 includes a packet analysis based IoT device management system 708. The packet analysis based IoT device management system 708 functions according to an applicable system for managing IoT devices using packet analysis, such as the IoT device management systems described in this paper.

The packet analysis IoT device management system 708 includes applicable systems for managing event logs, access logs, and system logs of IoT devices through packet analysis, such as the packet analysis based access log management systems, the packet analysis based system log management systems, and packet analysis based event log management systems described in this paper. In the example system shown in FIG. 7, the applicable systems of the packet analysis based IoT device management system 708 for managing event logs, access logs, and system logs of IoT devices through packet analysis are implemented at the local network 702 as part of a local appliance. In being implemented as part of a local appliance, the packet analysis based IoT device management system 708 can analyze packets locally for purposes of maintaining access logs, system logs, and event logs.

In the example system shown in FIG. 7, the cloud 704 includes a packet analysis based IoT device profiling system 710. Depending upon implementation-specific or other considerations, the cloud 704 can include an applicable system for determining IoT device vulnerabilities, such as the packet based IoT device vulnerability determination systems described in this paper. The cloud 704 can be specific to a private entity. The packet analysis based IoT device profiling system 710 functions according to an applicable system for profiling IoT devices, such as the packet analysis based IoT device management systems described in this paper. The packet analysis based IoT device profiling system 710 can receive event logs, access logs, and/or system logs in real-time as they are updated, through VPN tunnels from the packet analysis based IoT device management system 708 implemented at the local network 702. The packet analysis based IoT device profiling system 710 can use received event logs, access logs, and/or system logs to profile IoT device into device profiles.

In the example system shown in FIG. 7, the third party cloud 706 receives profile data indicating device profiles of IoT devices through VPN tunnels. The third party cloud 706 receives profile data indicating device profiles of IoT devices through VPN tunnels from the packet analysis based IoT device profiling system 710 implemented at the cloud 704. In various implementations, the third party cloud 706 is associated with or used by a third party management system for managing IoT devices.

Figure 8:
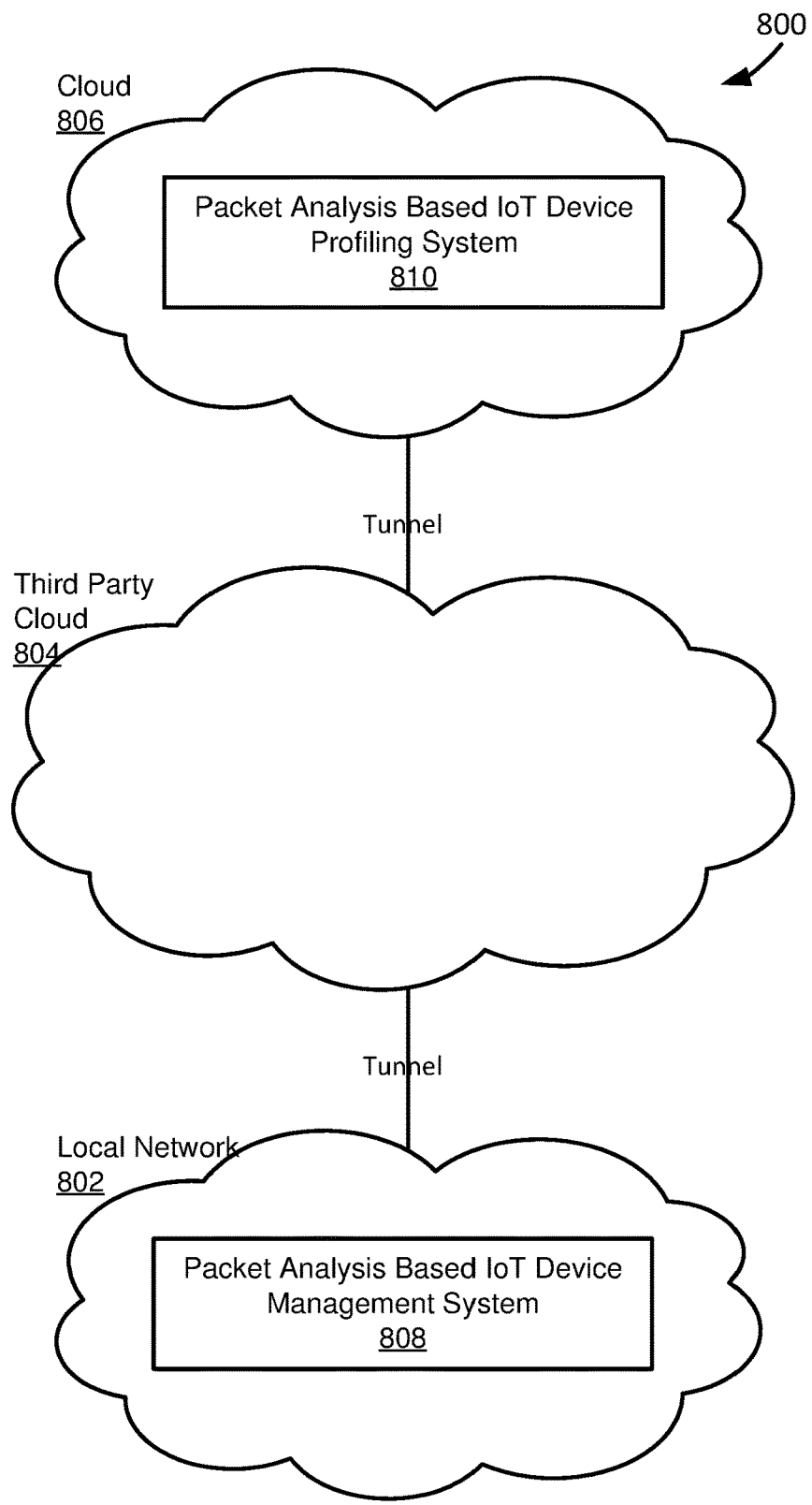
FIG. 8 depicts a diagram of another example of a system for packet analysis based IoT device management.

FIG. 8 depicts a diagram 800 of another example of a system for packet analysis based IoT device management. The example system shown in FIG. 8 includes a local network 802, a third party cloud 804, and a cloud 806. The local network 802 includes a packet analysis based IoT device management system 808. The packet analysis based IoT device management system 808 functions according to an applicable system for managing IoT devices using packet analysis, such as the IoT device management systems described in this paper.

The packet analysis IoT device management system 808 includes applicable systems for managing event logs, access logs, and system logs of IoT devices through packet analysis, such as the packet analysis based access log management systems, the packet analysis based log management systems, and packet analysis based event log management systems described in this paper. In the example system shown in FIG. 8, the applicable systems of the packet analysis based IoT device management system 808 for managing event logs, access logs, and system logs of IoT devices through packet analysis are implemented at the local network 802 as part of a local appliance. In being implemented as part of a local appliance, the packet analysis based IoT device management system 808 can analyze packets locally for purposes of maintaining access logs, system logs, and event logs.

In the example system shown in FIG. 8, the third party cloud 804 receives applicable data for profiling IoT devices, such as event logs, access logs, and/or system logs through VPN tunnels from the packet analysis based IoT device management system 808 implemented at the local network 802. In various implementations, the third party cloud 804 is associated with or used by a third party management system for managing IoT devices.

In the example system shown in FIG. 8, the cloud 806 includes a packet analysis based IoT device profiling system 810. Depending upon implementation-specific or other considerations, the cloud 806 can include an applicable system for determining IoT device vulnerabilities, such as the packet based IoT device vulnerability determination systems described in this paper. The cloud 806 can be specific to a private entity. The packet analysis based IoT device profiling system 810 functions according to an applicable system for profiling IoT devices, such as the packet analysis based IoT device management systems described in this paper. The packet analysis based IoT device profiling system 810 can receive event logs, access logs, and/or system logs in real-time as they are updated, through VPN tunnels from the third party cloud 804, which are received at the third party cloud 804 from the packet analysis based IoT device management system 808 implemented at the local network 802.

The packet analysis based IoT device profiling system 810 can use received event logs, access logs, and/or system logs to profile IoT device into device profiles. The packet analysis based IoT device profiling system 810 can send generated device profiles back to the third party cloud 804 through VPN tunnels. In various implementations, the third party cloud 804 can use device profiles received from the packet analysis based IoT device profiling system 810 to manage IoT devices in the location network 802.

Figure 9:
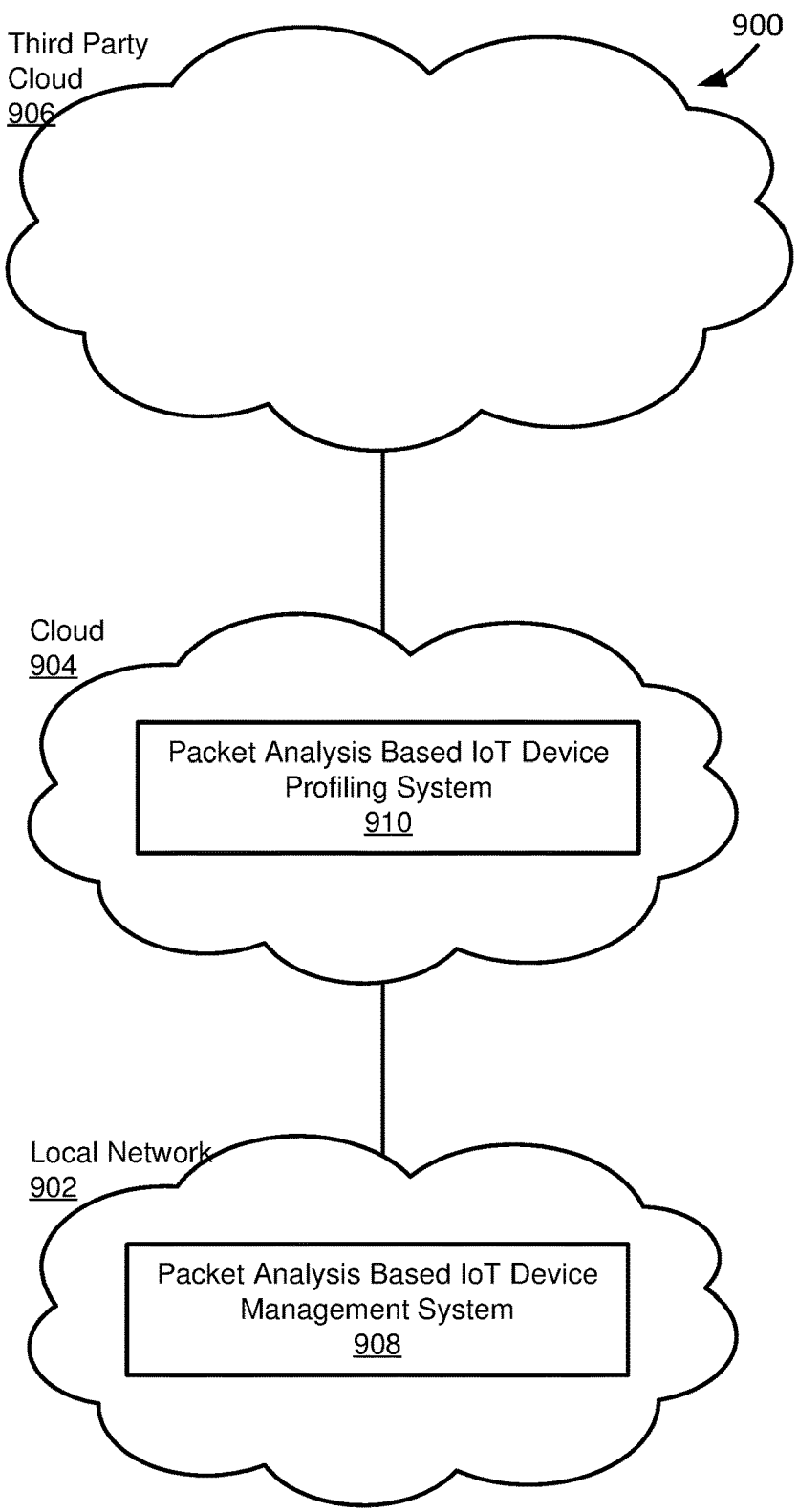
FIG. 9 depicts a diagram of an example of another system for packet analysis based IoT device management.

FIG. 9 depicts a diagram 900 of an example of another system for packet analysis based IoT device management. The example system shown in FIG. 9 includes a local network 902, a cloud 904, and a third party cloud 906. The local network 902 is formed by at least one managed IoT device and a local appliance. The local network 902 includes a packet analysis based IoT device management system 908. The packet analysis based IoT device management system 908 functions according to an applicable system for managing IoT devices using packet analysis, such as the IoT device management systems described in this paper.

The packet analysis IoT device management system 908 includes applicable systems for managing event logs, access logs, and system logs of IoT devices through packet analysis, such as the packet analysis based access log management systems, the packet analysis based log management systems, and packet analysis based event log management systems described in this paper. In the example system shown in FIG. 9, the applicable systems of the packet analysis based IoT device management system 908 for managing event logs, access logs, and system logs of IoT devices through packet analysis are implemented at the local network 902 as part of a local appliance. In being implemented as part of a local appliance, the packet analysis based IoT device management system 908 can analyze packets locally for purposes of maintaining access logs, system logs, and event logs.

In the example system shown in FIG. 9, the cloud 904 includes a packet analysis based IoT device profiling system 910. Depending upon implementation-specific or other considerations, the cloud 904 can include an applicable system for determining IoT device vulnerabilities, such as the packet based IoT device vulnerability determination systems described in this paper. The cloud 904 can be specific to a private entity. The packet analysis based IoT device profiling system 910 functions according to an applicable system for profiling IoT devices, such as the packet analysis based IoT device management systems described in this paper. The packet analysis based IoT device profiling system 910 can receive event logs, access logs, and/or system logs in real-time as they are updated, through traditional network channels, e.g. using protocols of a network through which the data is being transmitted/without the use of VPN tunneling, from the packet analysis based IoT device management system 908 implemented at the local network 902. The packet analysis based IoT device profiling system 910 can use received event logs, access logs, and/or system logs to profile IoT device into device profiles.

In the example system shown in FIG. 9, the third party cloud 906 receives profile data indicating device profiles of IoT devices through traditional network channels. The third party cloud 906 receives profile data indicating device profiles of IoT devices through traditional network channels from the packet analysis based IoT device profiling system 910 implemented at the cloud 904. In various implementations, the third party cloud 906 is associated with or used by a third party management system for managing IoT devices.

Figure 10:
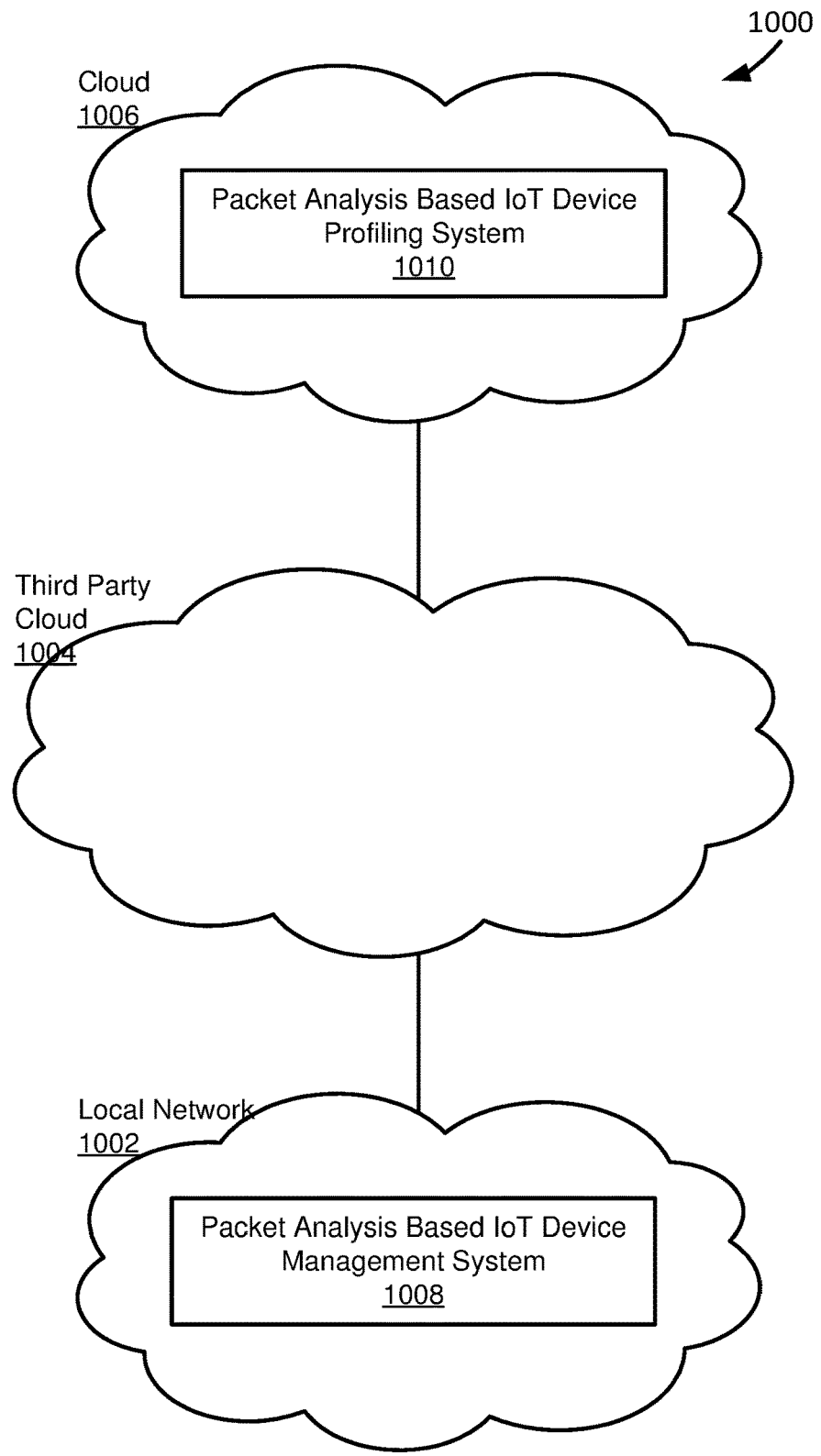
FIG. 10 depicts a diagram of another example of a system for packet analysis based IoT device management.

FIG. 10 depicts a diagram 1000 of another example of a system for packet analysis based IoT device management. The example system shown in FIG. 10 includes a local network 1002, a third party cloud 1004, and a cloud 1006. The local network 1002 includes a packet analysis based IoT device management system 1008. The packet analysis based IoT device management system 1008 functions according to an applicable system for managing IoT devices using packet analysis, such as the IoT device management systems described in this paper.

The packet analysis IoT device management system 1008 includes applicable systems for managing event logs, access logs, and system logs of IoT devices through packet analysis, such as the packet analysis based access log management systems, the packet analysis based log management systems, and packet analysis based event log management systems described in this paper. In the example system shown in FIG. 10, the applicable systems of the packet analysis based IoT device management system 1008 for managing event logs, access logs, and system logs of IoT devices through packet analysis are implemented at the local network 1002 as part of a local appliance. In being implemented as part of a local appliance, the packet analysis based IoT device management system 1008 can analyze packets locally for purposes of maintaining access logs, system logs, and event logs.

In the example system shown in FIG. 10, the third party cloud 1004 receives applicable data for profiling IoT devices, such as event logs, access logs, and/or system logs through traditional network channels from the packet analysis based IoT device management system 1008 implemented at the local network 1002. In various implementations, the third party cloud 1004 is associated with or used by a third party management system for managing IoT devices.

In the example system shown in FIG. 10, the cloud 1006 includes a packet analysis based IoT device profiling system 1010. Depending upon implementation-specific or other considerations, the cloud 1006 can include an applicable system for determining IoT device vulnerabilities, such as the packet based IoT device vulnerability determination systems described in this paper. The cloud 1006 can be specific to a private entity. The packet analysis based IoT device profiling system 1010 functions according to an applicable system for profiling IoT devices, such as the packet analysis based IoT device management systems described in this paper. The packet analysis based IoT device profiling system 1010 can receive event logs, access logs, and/or system logs in real-time as they are updated, through traditional network channels from the third party cloud 1004, which are received at the third party cloud 1004 from the packet analysis based IoT device management system 1008 implemented at the local network 1002.

The packet analysis based IoT device profiling system 1010 can use received event logs, access logs, and/or system logs to profile IoT device into device profiles. The packet analysis based IoT device profiling system 1010 can send generated device profiles back to the third party cloud 1004 through traditional network channels. In various implementations, the third party cloud 1004 can use device profiles received from the packet analysis based IoT device profiling system 1010 to manage IoT devices in the location network 802.

Figure 11:
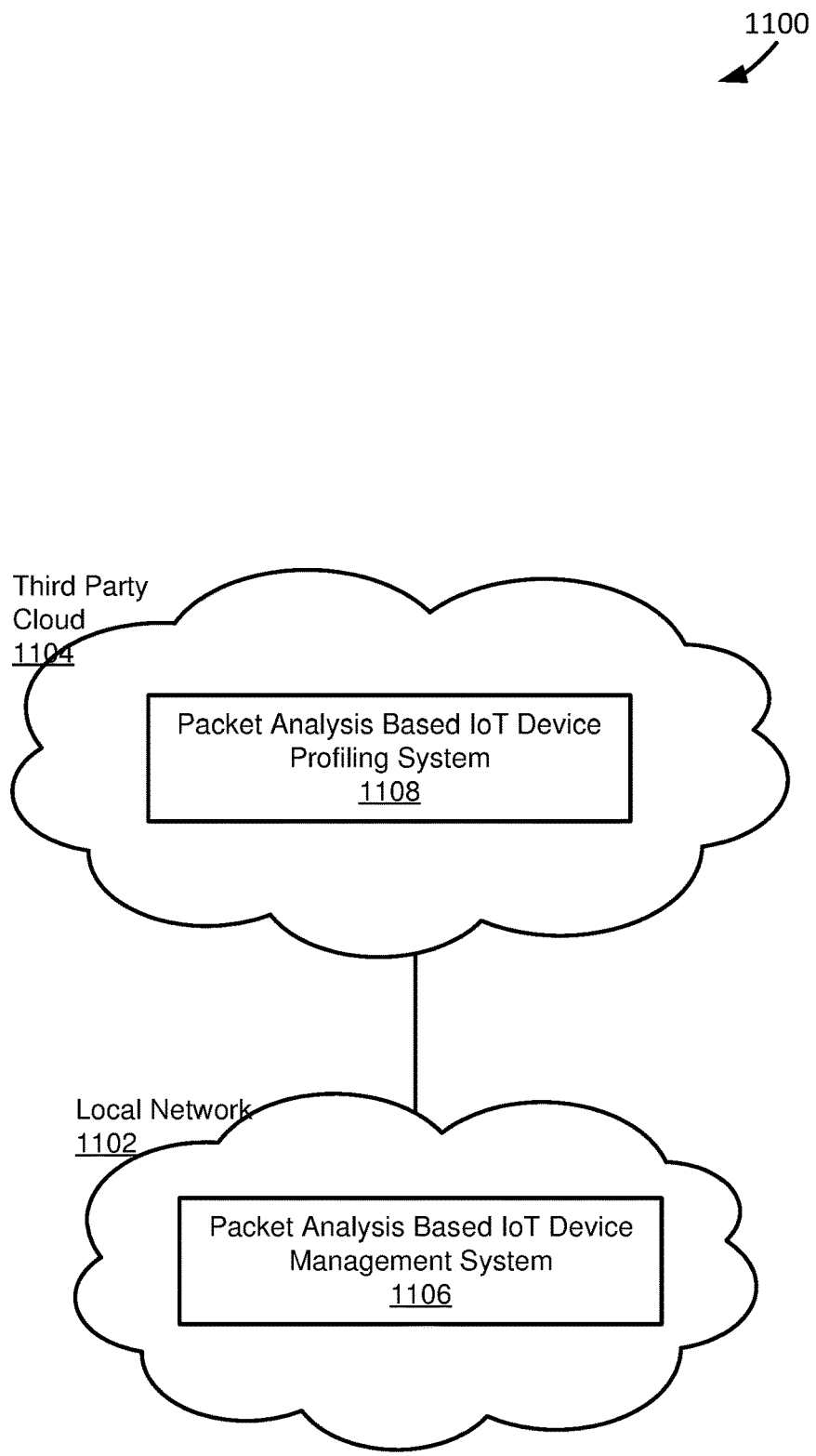
FIG. 11 depicts a diagram of another example of a system for packet analysis based IoT device management.

FIG. 11 depicts a diagram 1100 of another example of a system for packet analysis based IoT device management. The example system shown in FIG. 11 includes a local network 1102 and a third party cloud 1104. The local network 1102 includes a packet analysis based IoT device management system 1106. The packet analysis based IoT device management system 1106 functions according to an applicable system for managing IoT devices using packet analysis, such as the IoT device management systems described in this paper.

The packet analysis IoT device management system 1106 includes applicable systems for managing event logs, access logs, and system logs of IoT devices through packet analysis, such as the packet analysis based access log management systems, the packet analysis based log management systems, and packet analysis based event log management systems described in this paper. In the example system shown in FIG. 11, the applicable systems of the packet analysis based IoT device management system 1106 for managing event logs, access logs, and system logs of IoT devices through packet analysis are implemented at the local network 1102 as part of a local appliance. In being implemented as part of a local appliance, the packet analysis based IoT device management system 1106 can analyze packets locally for purposes of maintaining access logs, system logs, and event logs.

In the example system shown in FIG. 11, the third party cloud 1104 includes a packet analysis based IoT device profiling system 1108. Depending upon implementation-specific or other considerations, the third party cloud 1104 can include an applicable system for determining IoT device vulnerabilities, such as the packet based IoT device vulnerability determination systems described in this paper. The third party cloud 1104 is associated with or used by a third party management system for managing IoT devices. The packet analysis based IoT device profiling system 1108 functions according to an applicable system for profiling IoT devices, such as the packet analysis based IoT device management systems described in this paper. The packet analysis based IoT device profiling system 1108 can receive event logs, access logs, and/or system logs in real-time as they are updated, through VPN tunnels or traditional network channels from the packet analysis based IoT device management system 1106 implemented at the local network 1102. The packet analysis based IoT device profiling system 1108 can use received event logs, access logs, and/or system logs to profile IoT device into device profiles.

Figure 12:
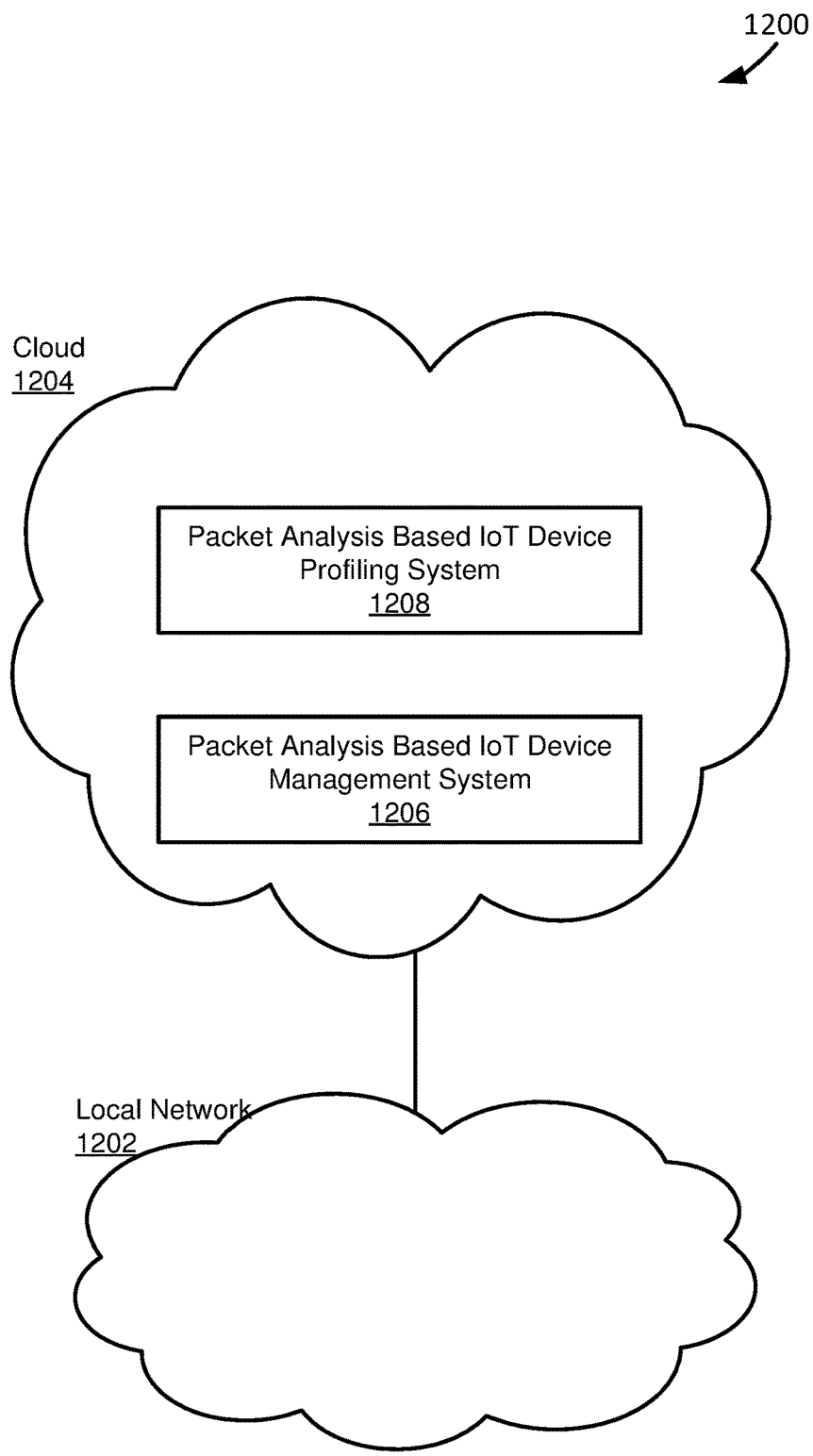
FIG. 12 depicts a diagram of another example of a system for packet analysis based IoT device management.

FIG. 12 depicts a diagram 1200 of another example of a system for packet analysis based IoT device management. The example system shown in FIG. 12 includes a local network 1202 and a cloud 1204. In various implementations, the cloud 1204 can be a third party cloud, e.g. a cloud of a third party IoT device management entity.

The local network 1202 includes at least one IoT device coupled to a local appliance. The local appliance can transmit data packets from the IoT device through the cloud 1204. The cloud includes a packet analysis based IoT device management system 1206 and a packet analysis based IoT device profiling system. The packet analysis based IoT device management system 1206 can obtain packets transmitted from IoT devices in the local network 1202 through the local appliance and/or data packets destined to IoT devices in the local network 1202 and will be transmitted through the local appliance. The packet analysis based IoT device management system 1206 can use obtained packets to build historical records of IoT devices by building event logs, system logs, and access logs through packet analysis of the obtained packets. The packet analysis based IoT device profiling system 1208 can use historical records of IoT devices to profile the IoT devices into device profiles.

Figure 13:
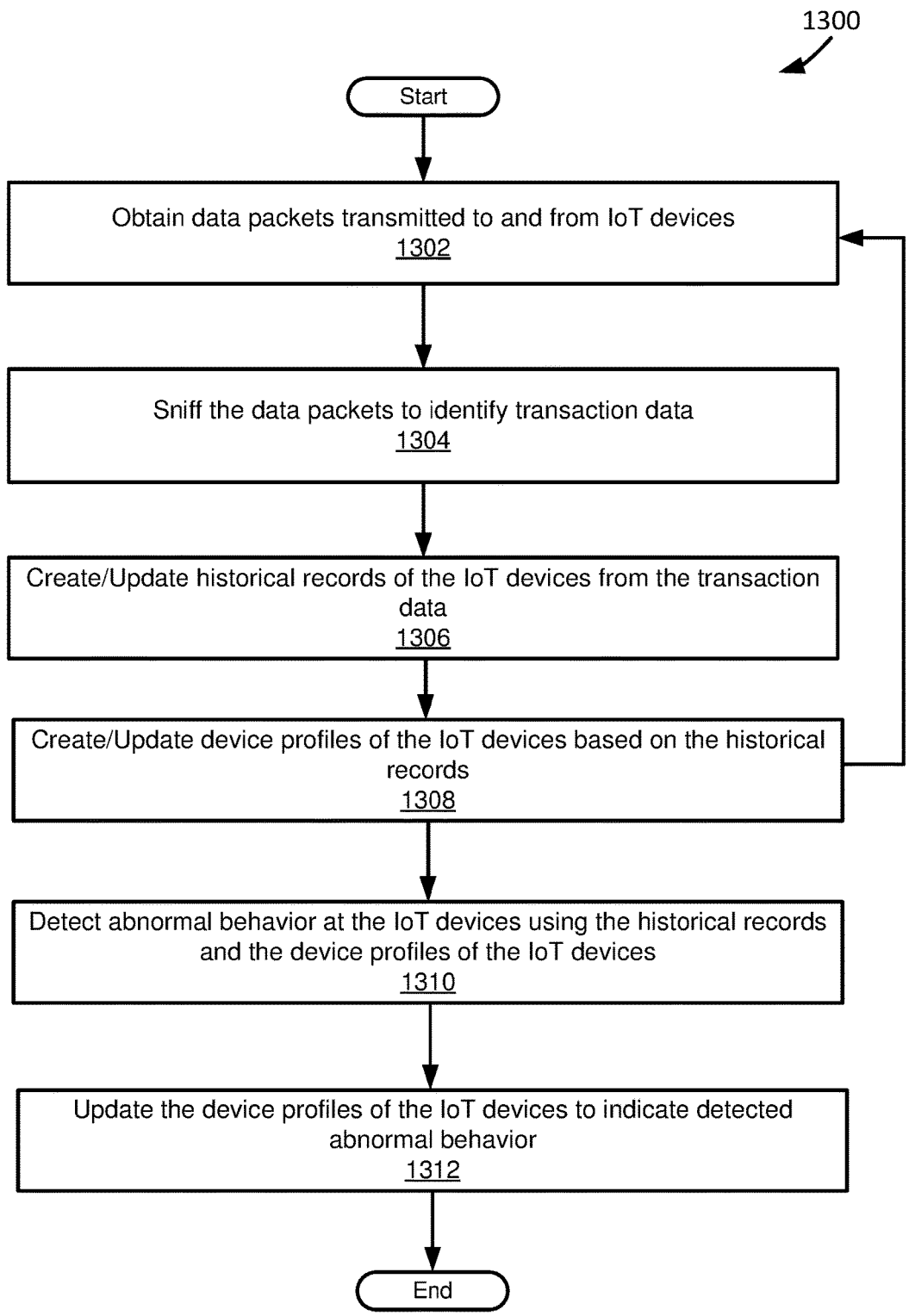
FIG. 13 depicts a flowchart of an example of a method for generating device profiles of IoT devices through packet inspection.

FIG. 13 depicts a flowchart 1300 of an example of a method for generating device profiles of IoT devices through packet inspection. Device profiles generated according to the example method shown in FIG. 13 can be used in management of IoT devices, e.g. managing security of the IoT devices. The flowchart 1300 begins at module 1302, where data packets transmitted to and from IoT devices are obtained. An applicable engine for controlling the flow of data to and from IoT devices, such as the data flow management engines described in this paper, can obtain data packets transmitted to and from IoT devices. In various implementations, data packets can be obtained at a local appliance with respect to the IoT devices. Depending upon implementation-specific or other considerations, data packets can be obtained at a location remote from IoT devices after they have been transmitted to the remote location by a local appliance or before they are transmitted through a local network to the IoT devices. Further depending upon implementation-specific or other considerations, data packets can be obtained based on a source, a destination, a data packet type, and data within a data packet. For example, all data packets from a particular source can be obtained. In various implementations, data packets can be transmitted using VPN tunnels.

The flowchart 1300 continues to module 1304, where the data packets are sniffed to identify transaction data. An applicable engine for analyzing the data packets, such as the packet inspector engines described in this paper, can sniff the data packets to identify transaction data. Depending upon implementation-specific or other considerations, data packets can be sniffed using deep packet inspection. For example, deep packet inspection can be used to identify transaction data from payloads of the data packets. Further depending upon implementation-specific or other considerations, specific data packets to perform deep packet inspection on can be selected based on at least one of a source of data packets, a destination of data packets, a data packet type of data packets, and data within data packets. For example, all data packets from a particular source can have deep packet inspection performed on them.

The flowchart 1300 continues to module 1306, where historical records of the IoT devices can be created/updated. An applicable engine for managing logs, such as one or a combination of the event log, system log, and access log management engines described in this paper, can create/update historical records for the IoT devices using the transaction data. Depending upon implementation-specific or other considerations, a historical record can include one or a combination of access logs, system logs, and event logs of the IoT devices.

The flowchart 1300 continues to module 1308, where device profiles of the IoT devices are created/updated based on the historical records. An applicable engine for profiling the IoT devices, such as the IoT device profiling engines described in this paper, can function to create/update device profiles of the IoT devices based on the historical records. Depending upon implementation-specific or other considerations, the IoT devices can be clustered before they are profiled into device profiles. Further depending upon implementation-specific or other considerations, determined vulnerabilities of IoT devices can be included in device profiles of the IoT devices. In generating device profiles of the IoT devices, baseline behavior of the IoT device can be determined from the historical records and included as part of the device profiles.

The flowchart 1300 continues to module 1310, where abnormal behavior at the IoT devices is detected using the historical records and the device profiles of the IoT devices. An applicable engine for detecting abnormal behavior, such as the anomaly detection engines described in this paper, can detect abnormal behavior at the IoT devices using the historical records and the device profiles of the IoT devices. For example, current operating of the IoT devices, indicated by the historical record which can be continuously updated in real-time, can be compared to baseline behavior of the IoT devices, indicated by the device profiles of the IoT devices, to determine if the IoT devices are exhibiting abnormal behavior.

The flowchart 1300 continues to module 1312, where the device profiles of the IoT devices are updated to indicate the abnormal behavior if it is detected at the IoT devices. An applicable engine for profiling IoT devices, such as the IoT device profiling engines described in this paper, can update the device profiles to indicate the detected abnormal behavior. For example, if an IoT device is communicating with a new device, then a device profile can be updated to indicate that the IoT device is communicating with the new device.

Figure 14:
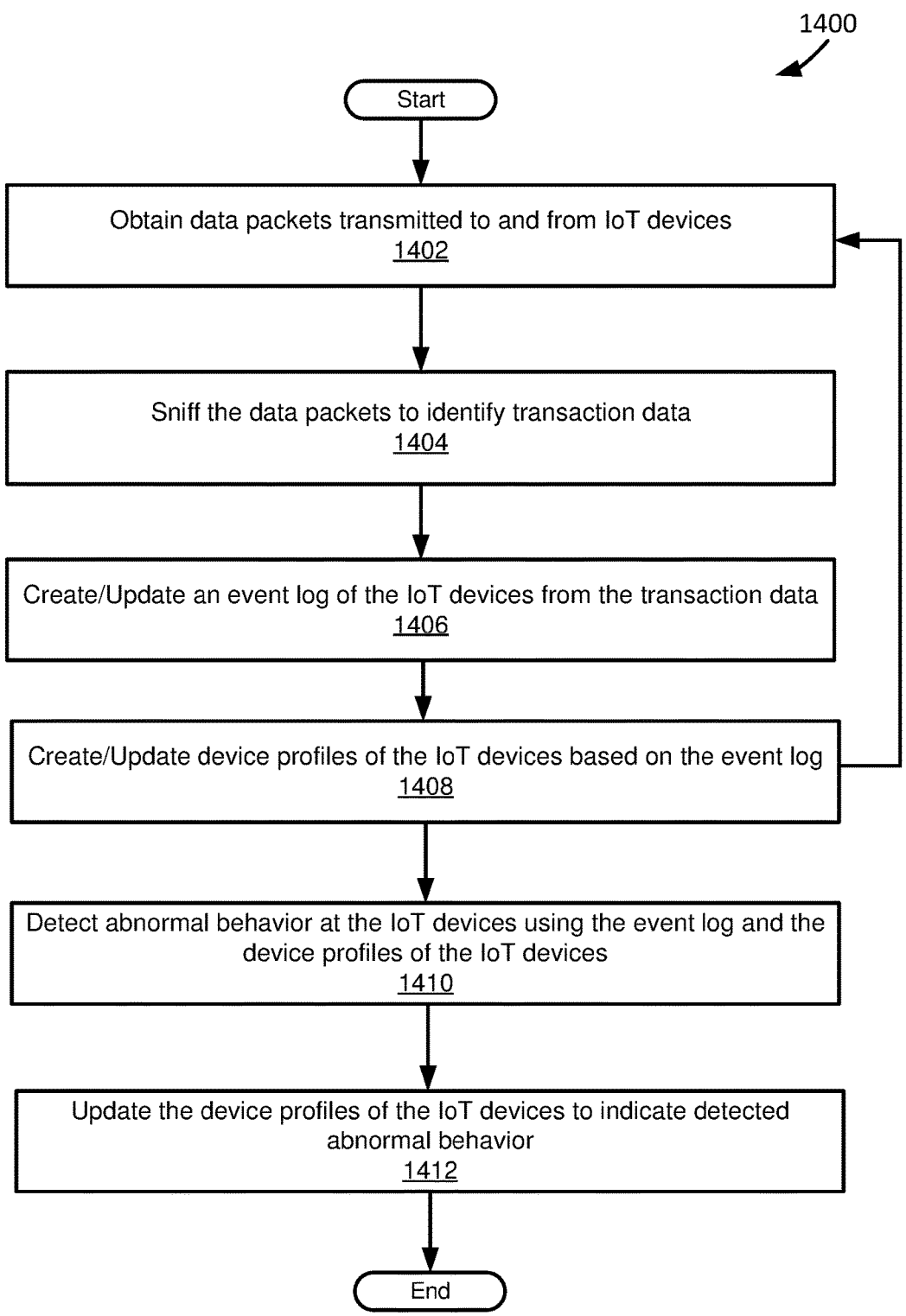
FIG. 14 depicts a flowchart of another example of a method for generating device profiles of IoT devices through packet inspection.

FIG. 14 depicts a flowchart 1400 of another example of a method for generating device profiles of IoT devices through packet inspection. Device profiles generated according to the example method shown in FIG. 14 can be used in management of IoT devices, e.g. managing security of the IoT devices. The flowchart 1400 begins at module 1402, where data packets transmitted to and from IoT devices are obtained. An applicable engine for controlling the flow of data to and from IoT devices, such as the data flow management engines described in this paper, can obtain data packets transmitted to and from IoT devices. In various implementations, data packets can be obtained at a local appliance with respect to the IoT devices. Depending upon implementation-specific or other considerations, data packets can be obtained at a location remote from IoT devices after they have been transmitted to the remote location by a local appliance or before they are transmitted through a local network to the IoT devices. Further depending upon implementation-specific or other considerations, data packets can be obtained based on a source, a destination, a data packet type, and data within a data packet. For example, all data packets from a particular source can be obtained. In various implementations, data packets can be transmitted using VPN tunnels.

The flowchart 1400 continues to module 1404, where the data packets are sniffed to identify transaction data. An applicable engine for sniffing the data packets, such as the packet inspector engines described in this paper, can sniff the data packets to identify transaction data. Depending upon implementation-specific or other considerations, data packets can be sniffed using deep packet inspection. For example, deep packet inspection can be used to identify transaction data from payloads of the data packets. Further depending upon implementation-specific or other considerations, specific data packets to perform deep packet inspection on can be selected based on at least one of a source of data packets, a destination of data packets, a data packet type of data packets, and data within data packets. For example, all data packets from a particular source can have deep packet inspection performed on them.

The flowchart 1400 continues to module 1406, where event logs of the IoT devices can be created/updated. An applicable engine for managing event logs, such as the event log management engines described in this paper, can create/update event logs for the IoT devices using the transaction data. An event log can be updated in real-time using the transaction data as it is identified in real-time as the IoT devices operate.

The flowchart 1400 continues to module 1408, where device profiles of the IoT devices are created/updated based on the event logs. An applicable engine for profiling the IoT devices, such as the IoT device profiling engines described in this paper, can function to create/update device profiles of the IoT devices based on the event logs. Depending upon implementation-specific or other considerations, the IoT devices can be clustered before they are profiled into device profiles. Further depending upon implementation-specific or other considerations, determined vulnerabilities of IoT devices can be included in device profiles of the IoT devices. In generating device profiles of the IoT devices, baseline behavior of the IoT device can be determined from the event logs and included as part of the device profiles.

The flowchart 1400 continues to module 1410, where abnormal behavior at the IoT devices is detected using the event logs and the device profiles of the IoT devices. An applicable engine for detecting abnormal behavior, such as the anomaly detection engines described in this paper, can detect abnormal behavior at the IoT devices using the event logs and the device profiles of the IoT devices. For example, current operating of the IoT devices, indicated by the event logs updated in real-time, can be compared to baseline behavior of the IoT devices, indicated by the device profiles of the IoT devices, to determine if the IoT devices are exhibiting abnormal behavior.

The flowchart 1400 continues to module 1412, where the device profiles of the IoT devices are updated to indicate the abnormal behavior if it is detected at the IoT devices. An applicable engine for profiling IoT devices, such as the IoT device profiling engines described in this paper, can update the device profiles to indicate the detected abnormal behavior. For example, if an IoT device is communicating with a new device, then a device profile can be updated to indicate that the IoT device is communicating with the new device.

Figure 15:
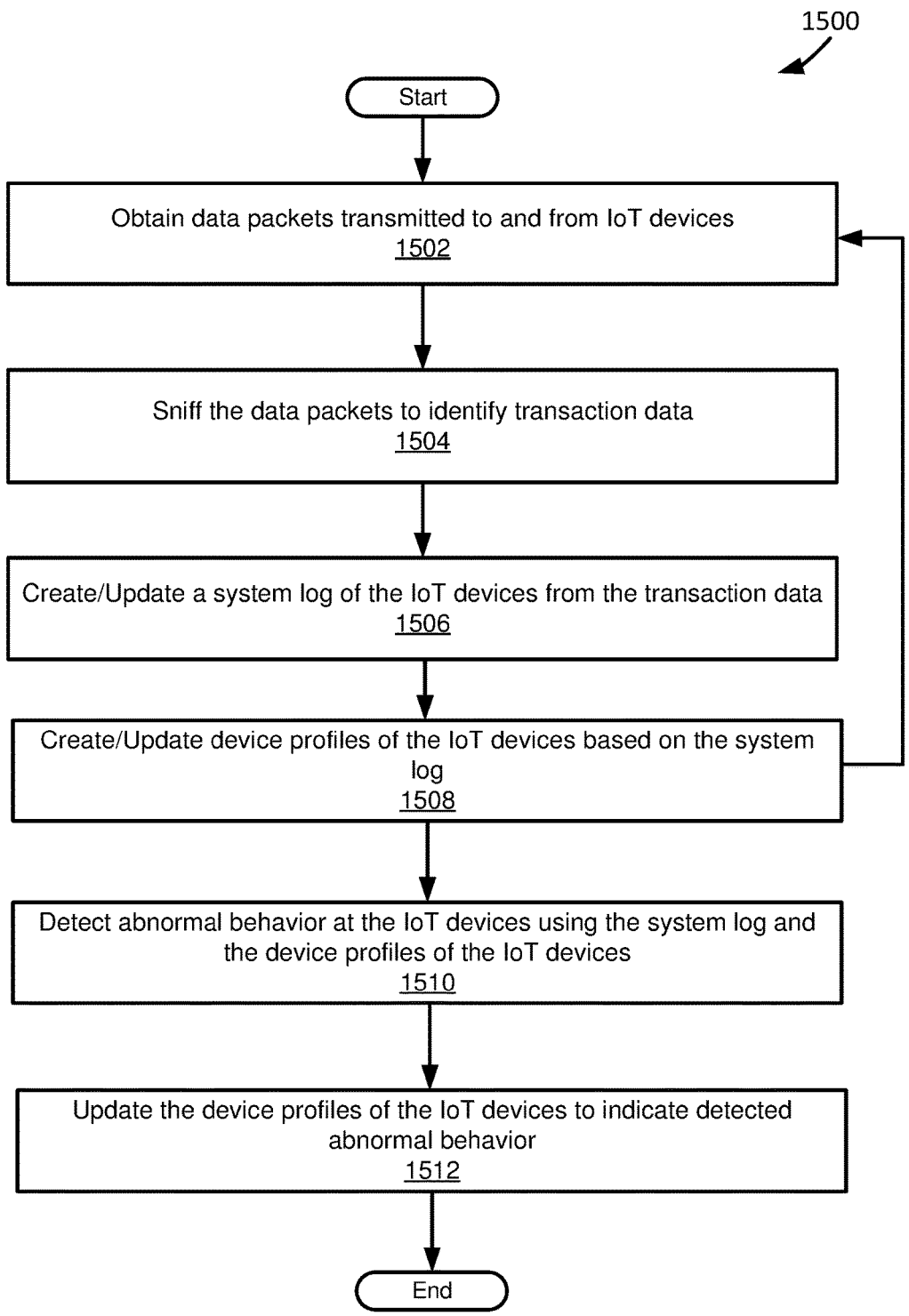
FIG. 15 depicts a flowchart of another example of a method for generating device profiles of IoT devices through packet inspection.

FIG. 15 depicts a flowchart 1500 of another example of a method for generating device profiles of IoT devices through packet inspection. Device profiles generated according to the example method shown in FIG. 15 can be used in management of IoT devices, e.g. managing security of the IoT devices. The flowchart 1500 begins at module 1502, where data packets transmitted to and from IoT devices are obtained. An applicable engine for controlling the flow of data to and from IoT devices, such as the data flow management engines described in this paper, can obtain data packets transmitted to and from IoT devices. In various implementations, data packets can be obtained at a local appliance with respect to the IoT devices. Depending upon implementation-specific or other considerations, data packets can be obtained at a location remote from IoT devices after they have been transmitted to the remote location by a local appliance or before they are transmitted through a local network to the IoT devices. Further depending upon implementation-specific or other considerations, data packets can be obtained based on a source, a destination, a data packet type, and data within a data packet. For example, all data packets from a particular source can be obtained. In various implementations, data packets can be transmitted using VPN tunnels.

The flowchart 1500 continues to module 1504, where the data packets are sniffed to identify transaction data. An applicable engine for sniffing the data packets, such as the packet inspector engines described in this paper, can sniff the data packets to identify transaction data. Depending upon implementation-specific or other considerations, data packets can be sniffed using deep packet inspection. For example, deep packet inspection can be used to identify transaction data from payloads of the data packets. Further depending upon implementation-specific or other considerations, specific data packets to perform deep packet inspection on can be selected based on at least one of a source of data packets, a destination of data packets, a data packet type of data packets, and data within data packets. For example, all data packets from a particular source can have deep packet inspection performed on them.

The flowchart 1500 continues to module 1506, where system logs of the IoT devices can be created/updated. An applicable engine for managing system logs, such as the system log management engines described in this paper, can create/update system logs for the IoT devices using the transaction data. A system log can be updated in real-time using the transaction data as it is identified in real-time as the IoT devices operate.

The flowchart 1500 continues to module 1508, where device profiles of the IoT devices are created/updated based on the system logs. An applicable engine for profiling the IoT devices, such as the IoT device profiling engines described in this paper, can function to create/update device profiles of the IoT devices based on the system logs. Depending upon implementation-specific or other considerations, the IoT devices can be clustered before they are profiled into device profiles. Further depending upon implementation-specific or other considerations, determined vulnerabilities of IoT devices can be included in device profiles of the IoT devices. In generating device profiles of the IoT devices, baseline behavior of the IoT device can be determined from the system logs and included as part of the device profiles.

The flowchart 1500 continues to module 1510, where abnormal behavior at the IoT devices is detected using the system logs and the device profiles of the IoT devices. An applicable engine for detecting abnormal behavior, such as the anomaly detection engines described in this paper, can detect abnormal behavior at the IoT devices using the system logs and the device profiles of the IoT devices. For example, current applications executing at the IoT devices, indicated by the system logs updated in real-time, can be compared to baseline behavior of the IoT devices, indicated by the device profiles of the IoT devices, to determine if the IoT devices are exhibiting abnormal behavior by executing new applications.

The flowchart 1500 continues to module 1512, where the device profiles of the IoT devices are updated to indicate the abnormal behavior if it is detected at the IoT devices. An applicable engine for profiling IoT devices, such as the IoT device profiling engines described in this paper, can update the device profiles to indicate the detected abnormal behavior. For example, if an IoT device is executing a new application, then a device profile can be updated to indicate that the IoT device is executing a new application.

Figure 16:
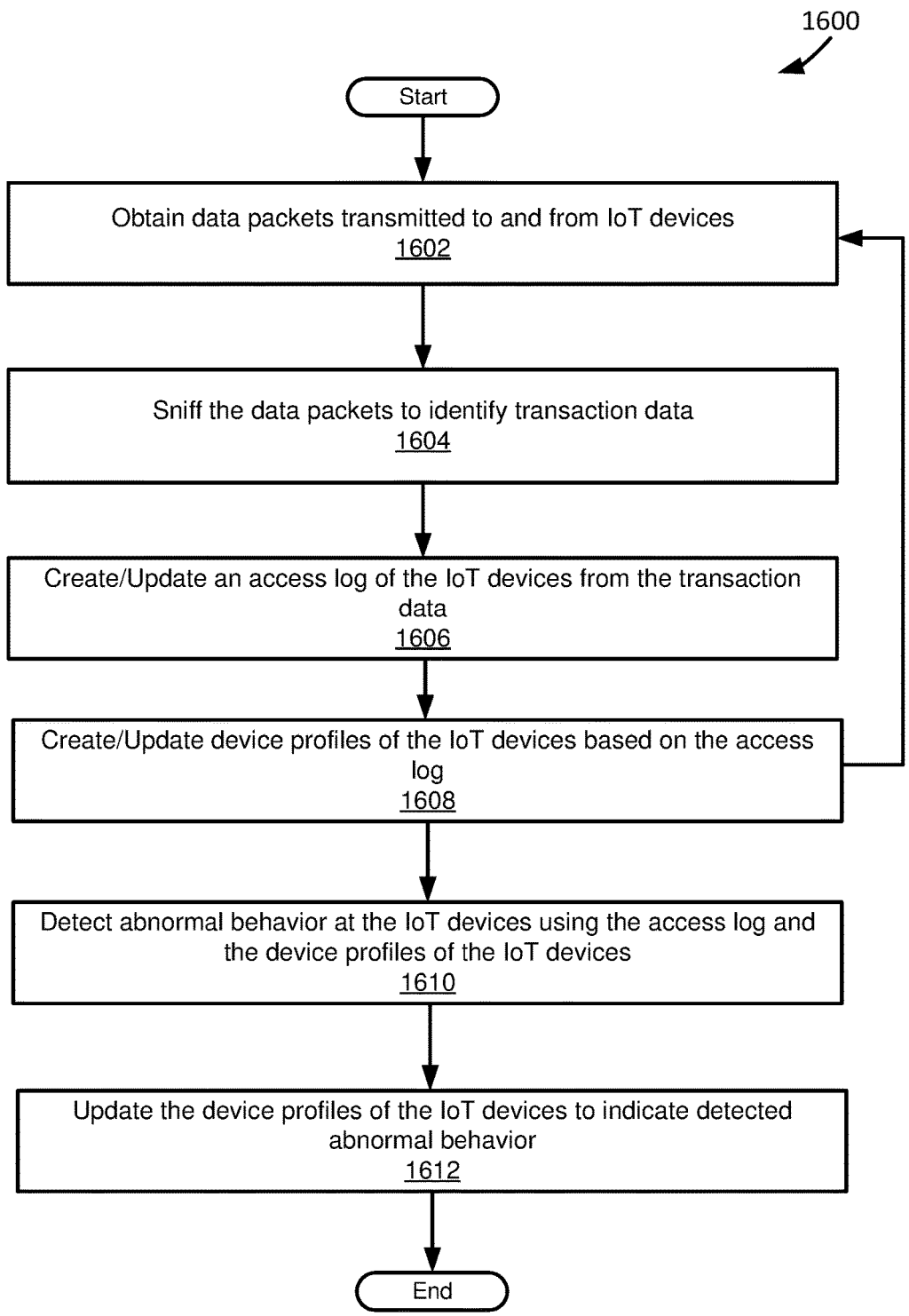
FIG. 16 depicts a flowchart of another example of a method for generating device profiles of IoT devices through packet inspection.

FIG. 16 depicts a flowchart 1600 of another example of a method for generating device profiles of IoT devices through packet inspection. Device profiles generated according to the example method shown in FIG. 16 can be used in management of IoT devices, e.g. managing security of the IoT devices. The flowchart 1600 begins at module 1602, where data packets transmitted to and from IoT devices are obtained. An applicable engine for controlling the flow of data to and from IoT devices, such as the data flow management engines described in this paper, can obtain data packets transmitted to and from IoT devices. In various implementations, data packets can be obtained at a local appliance with respect to the IoT devices. Depending upon implementation-specific or other considerations, data packets can be obtained at a location remote from IoT devices after they have been transmitted to the remote location by a local appliance or before they are transmitted through a local network to the IoT devices. Further depending upon implementation-specific or other considerations, data packets can be obtained based on a source, a destination, a data packet type, and data within a data packet. For example, all data packets from a particular source can be obtained. In various implementations, data packets can be transmitted using VPN tunnels.

The flowchart 1600 continues to module 1604, where the data packets are sniffed to identify transaction data. An applicable engine for sniffing the data packets, such as the packet inspector engines described in this paper, can sniff the data packets to identify transaction data. Depending upon implementation-specific or other considerations, data packets can be sniffed using deep packet inspection. For example, deep packet inspection can be used to identify transaction data from payloads of the data packets. Further depending upon implementation-specific or other considerations, specific data packets to perform deep packet inspection on can be selected based on at least one of a source of data packets, a destination of data packets, a data packet type of data packets, and data within data packets. For example, all data packets from a particular source can have deep packet inspection performed on them.

The flowchart 1600 continues to module 1606, where access logs of the IoT devices can be created/updated. An applicable engine for managing access logs, such as the access log management engines described in this paper, can create/update access logs for the IoT devices using the transaction data. An access log can be updated in real-time using the transaction data as it is identified in real-time as the IoT devices operate.

The flowchart 1600 continues to module 1608, where device profiles of the IoT devices are created/updated based on the access logs. An applicable engine for profiling the IoT devices, such as the IoT device profiling engines described in this paper, can function to create/update device profiles of the IoT devices based on the access logs. Depending upon implementation-specific or other considerations, the IoT devices can be clustered before they are profiled into device profiles. Further depending upon implementation-specific or other considerations, determined vulnerabilities of IoT devices can be included in device profiles of the IoT devices. In generating device profiles of the IoT devices, baseline behavior of the IoT device can be determined from the system logs and included as part of the device profiles.

The flowchart 1600 continues to module 1610, where abnormal behavior at the IoT devices is detected using the access logs and the device profiles of the IoT devices. An applicable engine for detecting abnormal behavior, such as the anomaly detection engines described in this paper, can detect abnormal behavior at the IoT devices using the access logs and the device profiles of the IoT devices. For example, current users the IoT devices are interacting with, indicated by the access logs updated in real-time, can be compared to baseline behavior of the IoT devices, indicated by the device profiles of the IoT devices, to determine if the IoT devices are exhibiting abnormal behavior by interacting with new users.

The flowchart 1600 continues to module 1612, where the device profiles of the IoT devices are updated to indicate the abnormal behavior if it is detected at the IoT devices. An applicable engine for profiling IoT devices, such as the IoT device profiling engines described in this paper, can update the device profiles to indicate the detected abnormal behavior. For example, if an IoT device is interacting with a new user, then a device profile can be updated to indicate that the IoT device is interacting with the new user.

Figure 17:
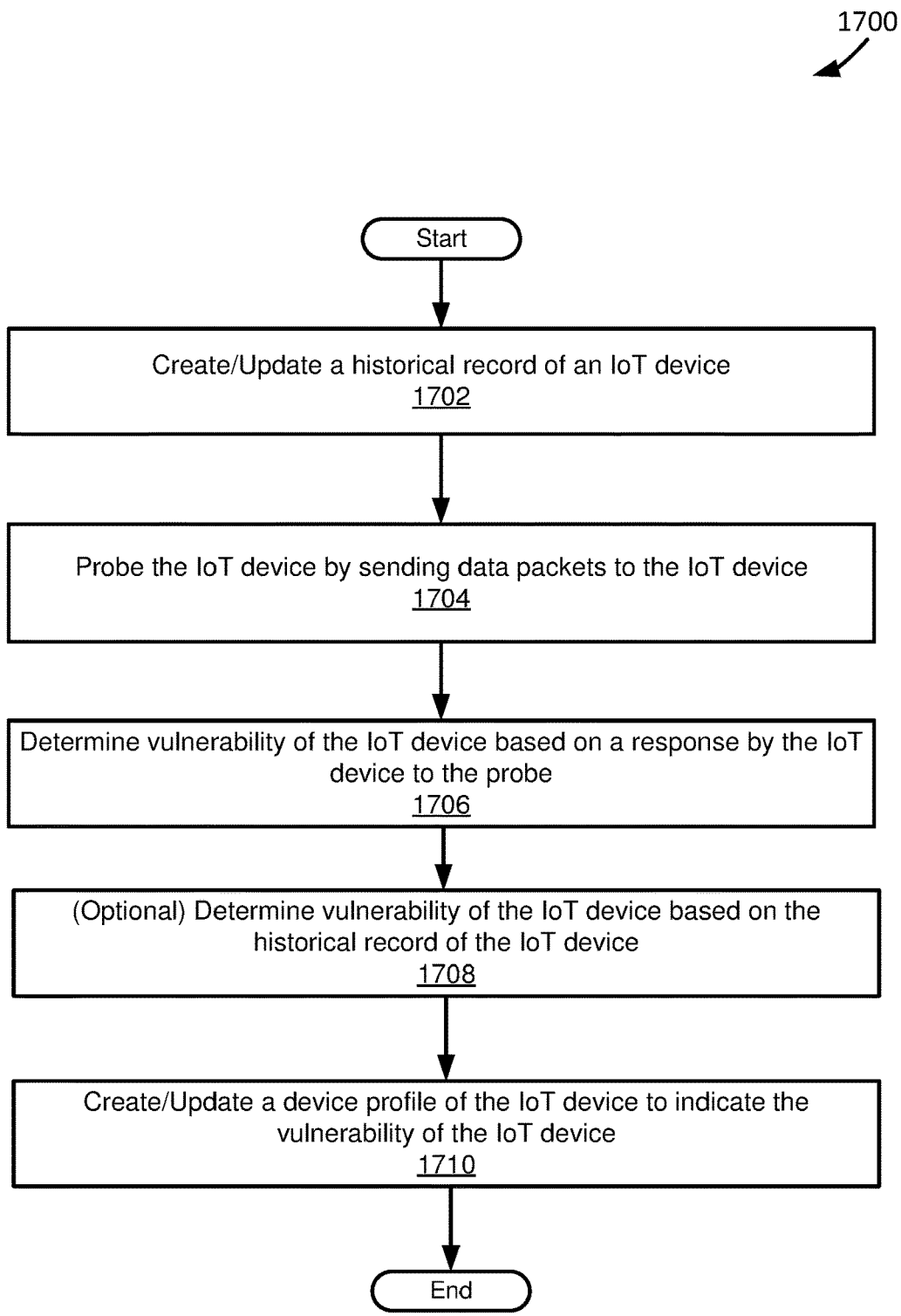
FIG. 17 depicts a flowchart of an example of a method for generating device profiles of IoT devices by determining vulnerabilities of IoT devices.

FIG. 17 depicts a flowchart 1700 of an example of a method for generating device profiles of IoT devices by determining vulnerabilities of IoT devices. The flowchart 1700 begins at module 1702, where a historical record of an IoT device is created/updated. A historical record of an IoT device can be created from one or a combination of an event log, a system log, and an access log of the IoT device. An event log, a system log, and an access log can be created using packet sniffing of data packets transmitted to and from the IoT device. Depending upon implementation-specific or other considerations, an event log, a system log, and an access log can be created from transaction data identified from deep packet inspection of data packets transmitted to and from the IoT device.

The flowchart 1700 continues to module 1704, where the IoT device is probed by sending data packets to the IoT device. An applicable engine for probing an IoT device, such as the IoT device probing engines described in this paper, can prove the IoT device by sending data packets to the IoT device. Depending upon implementation-specific or other considerations, the IoT device can be probed by sending data packets to the IoT device to simulate an attack on the IoT device. Further depending upon implementation-specific or other considerations, the IoT device can be probed by sending data packets to the IoT device to force the IoT device to respond.

The flowchart 1700 continues to module 1706, where vulnerability of the IoT device is determined based on the response by the IoT device to the probe. An applicable engine for determining IoT device vulnerability, such as the vulnerability determination engines described in this paper, can determine a vulnerability of the IoT device based on the response by the IoT device to the probe. Depending upon implementation-specific or other considerations, vulnerability of the IoT device can be determined based on an analysis of data packets transmitted from the IoT device in response to the probe. Further depending upon implementation-specific or other considerations, vulnerability of the IoT device can be determined based on an analysis of how the IoT device actually responds, e.g. whether it does not respond, to the probe.

The flowchart 1700 continues to module 1708, where optionally a vulnerability of the IoT device is determined based on the historical record of the IoT device. An applicable engine for determining IoT device vulnerability, such as the vulnerability determination engines described in this paper, can determine a vulnerability of the IoT device based on the historical record of the IoT device. For example, a historical record can be checked to see if the IoT device is the subject of a random scan by a user and subsequently determined vulnerability of the IoT device.

The flowchart 1700 continues to module 1710, where a device profile of the IoT device is created/updated to indicate the vulnerability of the IoT device. An applicable engine for profiling IoT devices, such as the IoT device profiling engines described in this paper, can create/update a device profile of the IoT device to indicate the determined vulnerability of the IoT device. In various implementations, the device profile of the IoT device can be used to manage security at the IoT device.

Figure 18:
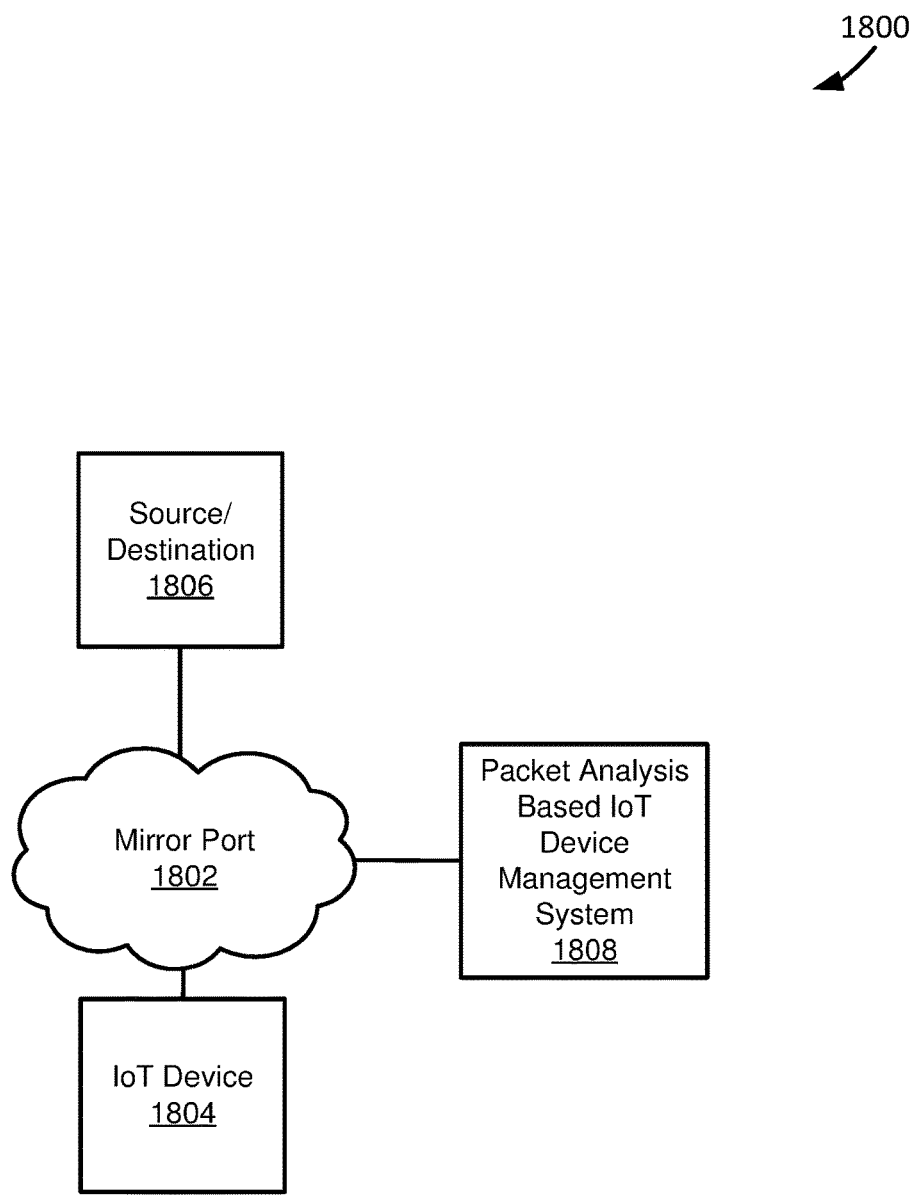
FIG. 18 depicts a diagram of an example of a system for providing packet analysis based IoT device management through a mirror point.

FIG. 18 depicts a diagram 1800 of an example of a system for providing packet analysis based IoT device management through a mirror point. The example system shown in FIG. 18 includes a mirror port 1802, an IoT device 1804, a source/destination 1806, and a packet analysis based IoT device management system 1808. The mirror port 1802 functions according to an applicable port for performing port mirroring on another port. In various implementations, the mirror port 1802 can be used to obtain data packets transmitted to and from IoT devices without disrupting the flow of the data packets. The mirror port 1802 can be implemented as part of switches or other applicable networking devices. The mirror port 1802 can be implemented on network devices in a LAN of IoT devices, or on network devices in a WAN of IoT devices. For example, the mirror port 1802 can be implemented as part of a local router in an enterprise network of IoT devices. Further in the example, in being implemented as part of the local router in an enterprise network, the mirror port 1802 can be used to obtain data packets transmitted between IoT devices in the enterprise network, e.g. intranetwork traffic.

The IoT device 1804 functions according to an applicable IoT device, such as the IoT devices described in this paper. The IoT devices 1804 include wired or wireless interfaces through which the IoT devices 1804 can send and receive data over wired and wireless connections. The IoT devices 1804 can include unique identifiers which can be used in the transmission of data through a network. Unique identifiers of the IoT devices 1804 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference.

The source/destination 1806 functions according to an applicable source or destination of traffic sent to and from an IoT device. In various implementations, the source/destination 1806 can be a system on a WAN with respect to IoT devices. For example, the source/destination 1806 can be a system that an IoT device communicates with over the Internet. In various implementations, the source/destination 1806 can be a system or device on a LAN with respect to an IoT device. For example, the source/destination 1806 can be another IoT device in an enterprise network with which an IoT device communicates.

The packet analysis based IoT device management system 1808 functions according to an applicable system for managing IoT devices through packet analysis, such as the packet analysis based IoT device management systems described in this paper. The packet analysis based IoT device management system 1808 functions to manage or facilitate management of IoT devices using packet analysis of data packets transmitted to and from the IoT devices. In various implementations, the packet analysis based IoT device management system 1808 sniffs packets transmitted to and from IoT devices for the purposes of managing IoT devices. The packet analysis based IoT device management system 1808 can sniff packets to determine whether to perform deep packet inspection on the packets for purposes of IoT device management. For example, the packet analysis based IoT device management system 1806 can sniff packets to determine whether the packets are relevant to determining an event log of an IoT device and subsequently obtain the packets. In various implementations, the packet analysis based IoT device management system 1808 can perform deep packet inspection on data packets for use in managing the IoT devices. For example, the packet analysis based IoT device management system 1808 can generate an event log, system log, and/or access log based on deep packet inspection of packets sent to and from an IoT device. The packet analysis based IoT device management system 1808 can obtain data packets through a mirror port, without interrupting the flow of the data packets between sources and destinations.

In an example of operation of the example system shown in FIG. 18, the IoT device 1804 functions to send and receive data packets that the mirror port 1802 mirrors for purposes of providing IoT device management of the IoT device 1804. In the example of operation of the example system shown in FIG. 18, the source/destination 1806 transmits and receives data in response to data received from the IoT device 1804. In the example of operation of the example system shown in FIG. 18 the packet analysis based IoT device management system 1808 obtains data packets through the mirror port 1802 for use in managing the IoT device 1804 through packet analysis.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
   mirroring, by a mirror port provided in a local area network including an Internet of things (IoT) device, data packets transmitted to and from the IoT device;
   obtaining, by an IoT device management engine, the mirrored data packets from the mirror port;
   analyzing, by the IoT device management engine, at least one of the mirrored data packets using deep packet inspection to identify transaction data from payload of the at least one of the mirrored data packets;
   generating, by the IoT device management engine, an event log for the IoT device from the transaction data, the event log, at least in part, used to generate a historical record for the IoT device;
   profiling, by an IoT device profiling engine provided in a cloud that is outside of the local area network, the IoT device into a device profile based on the historical record for the IoT device;
   determining, by the IoT device profiling engine, baseline behavior of the IoT device from historical records of a plurality of IoT devices including the historical record for the IoT device;
   updating, by the IoT device management engine, the event log in real-time to indicate current operation of the IoT device;
   receiving, by the IoT device profiling engine, the event log updated in real-time from the IoT device management engine through a virtual private network tunnel;
   determining, by the IoT device profiling engine, abnormal device behavior of the IoT device using the event log received from the IoT device management engine and the baseline behavior;
   updating, by the IoT device profiling engine, the device profile to indicate the abnormal device behavior of the IoT device.

2. The method of claim 1, wherein the mirrored data packets are sent to a remote location from a local location of the IoT device through virtual private network tunnels implemented in a wide area network.

3. The method of claim 1, further comprising:
   clustering, by the IoT device profiling engine, the plurality of IoT devices including the IoT device into a cluster based on the historical records of the plurality of IoT devices including the historical record of the IoT device;
   profiling, by the IoT device profiling engine, the IoT device into the device profile based on the cluster.

4. The method of claim 1, further comprising:
   determining, by the IoT device management engine, at least one of the mirrored data packets to perform deep packet inspection on to identify the transaction data from the payload of the at least one of the mirrored data packets, based on an identification of the IoT device.

5. The method of claim 1, further comprising:
   determining, by the IoT device management engine system, at least one of the mirrored data packets to perform deep packet inspection on to identify the transaction data from the payload of the at least one of the mirrored data packets, based on a source of the at least one of the mirrored data packets.

6. The method of claim 1, further comprising:
   determining, by the IoT device management engine, at least one of the mirrored data packets to perform deep packet inspection on to identify the transaction data from the payload of the at least one of the mirrored data packets, based on a destination of the at least one of the mirrored data packets.

7. The method of claim 1, further comprising:
   determining, by the IoT device management engine, at least one of the mirrored data packets to perform deep packet inspection on to identify the transaction data from the payload of the at least one of the mirrored data packets, based on a packet type of the at least one of the mirrored data packets.

8. The method of claim 1, further comprising:
   determining, by the IoT device management engine, at least one of the mirrored data packets to perform deep packet inspection on to identify the transaction data from the payload of the at least one of the mirrored data packets, based on a data type of the at least one of the mirrored data packets.

9. The method of claim 1, further comprising:
   updating, by the IoT device profiling engine, the device profile to indicate the baseline behavior of the IoT device.

10. The method of claim 1, wherein mirroring the data packets transmitted to and from the IoT device includes sniffing the data packets.

11. The method of claim 1, further comprising generating, by the IoT device management engine, an access log for the IoT device from the transaction data, the access log, at least in part, used to generate the historical record for the IoT device.

12. The method of claim 1, further comprising generating, by the IoT device management engine, a system log for the IoT device from the transaction data, the system log, at least in part, used to generate the historical record for the IoT device.

13. A system comprising:
a mirror port provided in a local area network including an Internet of things (IoT) device and configured to mirror data packets transmitted to and from the IoT device;
one or more first processors provided in an IoT device management engine;
first memory storing first instructions, when executed by the one or more first processors, configured to cause the one or more first processors to:
obtain the mirrored data packets from the mirror port;
analyze at least one of the mirrored data packets using deep packet inspection to identify transaction data from payload of the at least one of the mirrored data packets;
generate an event log for the IoT device from the transaction data, the event log, at least in part, used to generate a historical record for the IoT device;
update the event log in real-time to indicate current operation of the IoT device;
one or more second processors provided in an IoT device profiling system in a cloud that is outside of the local area network;
second memory storing second instructions, when executed by the one or more second processors, configured to cause the one or more second processors to:
profile the IoT device into a device profile based on the historical record for the IoT device;
determine baseline behavior of the IoT device from historical records of a plurality of IoT devices including the historical record for the IoT device;
receive the event log updated in real-time from the IoT device management system through a virtual private network tunnel;
determine abnormal device behavior of the IoT device using the event log received from the IoT device management system and the baseline behavior;
update the device profile to indicate the abnormal device behavior of the IoT device.

14. The system of claim 13, wherein the mirrored data packets are sent to a remote location from a local location of the IoT device through virtual private network tunnels implemented in a wide area network.

15. The system of claim 13, wherein the second instructions are further configured to cause the one or more second processors to:
cluster the plurality of IoT devices including the IoT device into a cluster based on the historical records of the plurality of IoT devices including the historical record of the IoT device;
profile the IoT device into the device profile based on the cluster.

16. The system of claim 13, wherein the first instructions are further configured to cause the one or more first processors to determine at least one of the mirrored data packets to perform deep packet inspection on to identify the transaction data from the payload of the at least one of the mirrored data packets, based on an identification of the IoT device.

17. The system of claim 13, wherein the first instructions are further configured to cause the one or more first processors to determine at least one of the mirrored data packets to perform deep packet inspection on to identify the transaction data from the payload of the at least one of the mirrored data packets, based on a source of the at least one of the mirrored data packets.

18. The system of claim 13, wherein the first instructions are further configured to cause the one or more first processors to determine at least one of the mirrored data packets to perform deep packet inspection on to identify the transaction data from the payload of the at least one of the mirrored data packets, based on a destination of the at least one of the mirrored data packets.

19. The system of claim 13, wherein the first instructions are further configured to cause the one or more first processors to determine at least one of the mirrored data packets to perform deep packet inspection on to identify the transaction data from the payload of the at least one of the mirrored data packets, based on a packet type of the at least one of the mirrored data packets.

20. The system of claim 13, wherein the first instructions are further configured to cause the one or more first processors to determine at least one of the mirrored data packets to perform deep packet inspection on to identify the transaction data from the payload of the at least one of the mirrored data packets, based on a data type of the at least one of the mirrored data packets.

21. The system of claim 13, wherein the second instructions are further configured to cause the one or more second processors to update the device profile to indicate the baseline behavior of the IoT device.

22. The system of claim 13, wherein the mirror port is configured to sniff the data packets transmitted to and from the IoT device as part of mirroring the data packets.

23. The system of claim 13, wherein the first instructions are further configured to cause the one or more first processors to generate an access log for the IoT device from the transaction data, the access log, at least in part, used to generate the historical record for the IoT device.

24. The system of claim 13, wherein the first instructions are further configured to cause the one or more first processors to generate a system log for the IoT device from the transaction data, the system log, at least in part, used to generate the historical record for the IoT device.

* * * * *